US011509726B2

(12) United States Patent
Alsina et al.

(10) Patent No.: US 11,509,726 B2
(45) Date of Patent: Nov. 22, 2022

(54) ENCAPSULATING AND SYNCHRONIZING STATE INTERACTIONS BETWEEN DEVICES

(71) Applicant: Apple Inc., Cupertino, CA (US)

(72) Inventors: Thomas Alsina, Mountain View, CA (US); Charles Magahern, Cupertino, CA (US); Cody D. Jorgensen, Cupertino, CA (US); Edward T. Schmidt, Cupertino, CA (US); Jason P. Ketterman, San Jose, CA (US); Nicholas J. Paulson, San Francisco, CA (US); Szu-Wen Huang, Union City, CA (US); Cesar de Camargo Barscevicius, Cupertino, CA (US); Elena Leyfman, Cupertino, CA (US); Keith Henrickson, Cupertino, CA (US); Andrew Sinesio, Cupertino, CA (US); Owen Imholte, Cupertino, CA (US); Harry Simmonds, Cupertino, CA (US)

(73) Assignee: APPLE INC., Cupertino, CA (US)

(*) Notice: Subject to any disclaimer, the term of this patent is extended or adjusted under 35 U.S.C. 154(b) by 0 days.

(21) Appl. No.: 16/146,098

(22) Filed: Sep. 28, 2018

(65) Prior Publication Data
US 2019/0124159 A1    Apr. 25, 2019

Related U.S. Application Data

(60) Provisional application No. 62/574,891, filed on Oct. 20, 2017, provisional application No. 62/620,737, (Continued)

(51) Int. Cl.
*G06F 15/16* (2006.01)
*H04L 67/143* (2022.01)
(Continued)

(52) U.S. Cl.
CPC ....... *H04L 67/143* (2013.01); *H04N 21/2543* (2013.01); *H04N 21/25841* (2013.01); (Continued)

(58) Field of Classification Search
CPC ... H04L 12/14; H04L 65/604; H04L 65/4076; H04L 65/4092; H04L 12/2838; (Continued)

(56) References Cited

U.S. PATENT DOCUMENTS 8,826,347 B1 * 9/2014 Earle .................. H04N 21/4622
725/115
9,021,370 B1 * 4/2015 Carlson .............. G06Q 30/0607
715/751

(Continued)

FOREIGN PATENT DOCUMENTS

CN   102090043 A   6/2011
CN   105355201 A   2/2016
(Continued)

OTHER PUBLICATIONS

European Patent Application No. 18201747.5; Extended Search Report; dated Apr. 17, 2019; 12 pages.
(Continued)

*Primary Examiner* — Dustin Nguyen
(74) *Attorney, Agent, or Firm* — BakerHostetler

(57) ABSTRACT

Techniques are disclosed for managing media playback among an ad hoc group of playback devices. Such techniques may involve building a session among the playback devices in which playback devices communicate information regarding their playback capabilities. Based on the playback capabilities of the devices, playback mode may be derived for the session. Playback operations may be synchronized among the devices that are members of the session, in which devices receive identification of asset(s) to
(Continued)

be rendered pursuant to the playback operation and timing information of playback of the asset. The devices may stream the playback assets directly from media sources when they are capable of doing so. In this manner, communication resources are conserved.

24 Claims, 15 Drawing Sheets

Related U.S. Application Data filed on Jan. 23, 2018, provisional application No. 62/650,699, filed on Mar. 30, 2018, provisional application No. 62/669,642, filed on May 10, 2018.

(51) Int. Cl.
| | |
|---|---|
| *H04N 21/43* | (2011.01) |
| *H04N 21/2543* | (2011.01) |
| *H04N 21/258* | (2011.01) |
| *H04N 21/262* | (2011.01) |
| *H04N 21/436* | (2011.01) |
| *H04N 21/61* | (2011.01) |

(52) U.S. Cl.
CPC ... *H04N 21/26258* (2013.01); *H04N 21/4302* (2013.01); *H04N 21/43615* (2013.01); *H04N 21/6125* (2013.01)

(58) Field of Classification Search
CPC ........ H04L 65/60; H04N 5/76; H04N 21/262; H04N 21/41407; H04N 21/64322; H04N 21/4126; H04N 21/812; H04N 21/8113; H04N 21/4305; H04N 21/4307; H04N 21/6543; H04N 21/25875; H04N 21/4122; H04N 21/4622; H04M 1/7253; H04R 27/00; H04R 5/04; G06Q 30/0607; G06Q 10/06; G10L 15/22; G10L 21/00; G06F 3/165; G06F 3/167; G06F 3/00; G06N 5/02; H04S 7/30
See application file for complete search history.

(56) References Cited

U.S. PATENT DOCUMENTS

| | | | |
|---|---|---|---|
| 9,330,096 B1 | 5/2016 | Fullerton et al. | |
| 9,431,021 B1* | 8/2016 | Scalise | G10L 21/00 |
| 9,846,564 B1* | 12/2017 | Toksoz | H04R 27/00 |
| 9,916,839 B1* | 3/2018 | Scalise | G06F 3/167 |
| 10,194,189 B1* | 1/2019 | Goetz | H04N 21/4122 |
| 2006/0174312 A1* | 8/2006 | Ducheneaut | H04N 5/76 |
| | | | 725/135 |
| 2006/0270395 A1* | 11/2006 | Dhawan | H04M 1/7253 |
| | | | 455/418 |
| 2008/0152165 A1* | 6/2008 | Zacchi | H04R 5/04 |
| | | | 381/77 |
| 2008/0177822 A1* | 7/2008 | Yoneda | H04N 21/64322 |
| | | | 709/202 |
| 2010/0010944 A1* | 1/2010 | Cheng | G06Q 10/06 |
| | | | 709/224 |
| 2010/0015945 A1* | 1/2010 | Shuman | H04L 12/14 |
| | | | 455/406 |
| 2012/0042047 A1 | 2/2012 | Chen et al. | |
| 2012/0210343 A1* | 8/2012 | McCoy | H04N 21/25875 |
| | | | 725/25 |
| 2013/0173517 A1* | 7/2013 | Berus | G06N 5/02 |
| | | | 706/45 |
| 2013/0174204 A1 | 7/2013 | Coburn et al. | |
| 2013/0198298 A1* | 8/2013 | Li | H04N 21/41407 |
| | | | 709/206 |
| 2013/0265488 A1* | 10/2013 | Yu | H04N 21/4307 |
| | | | 348/383 |
| 2014/0096169 A1* | 4/2014 | Dodson | H04N 21/812 |
| | | | 725/97 |
| 2014/0181270 A1 | 6/2014 | Millington | |
| 2014/0269757 A1* | 9/2014 | Park | H04N 21/4305 |
| | | | 370/432 |
| 2014/0334381 A1* | 11/2014 | Subramaniam | H04L 65/604 |
| | | | 370/328 |
| 2015/0058409 A1* | 2/2015 | Wang | H04L 12/2838 |
| | | | 709/203 |
| 2015/0128194 A1* | 5/2015 | Kuang | H04N 21/41407 |
| | | | 725/81 |
| 2015/0199122 A1* | 7/2015 | Garmark | H04L 65/4092 |
| | | | 715/716 |
| 2015/0223002 A1* | 8/2015 | Mehta | H04S 7/30 |
| | | | 381/303 |
| 2015/0288733 A1* | 10/2015 | Mao | H04L 65/4076 |
| | | | 709/219 |
| 2016/0026429 A1* | 1/2016 | Triplett | G06F 3/165 |
| | | | 715/716 |
| 2016/0182513 A1 | 6/2016 | Pollock | |
| 2016/0184726 A1* | 6/2016 | Andersson | G06F 3/00 |
| | | | 710/8 |
| 2016/0189232 A1* | 6/2016 | Meyer | H04L 65/60 |
| | | | 705/14.58 |
| 2017/0273044 A1 | 9/2017 | Alsina et al. | |
| 2017/0273067 A1 | 9/2017 | Alsina et al. | |
| 2017/0289500 A1 | 10/2017 | Biderman et al. | |
| 2018/0018967 A1* | 1/2018 | Lang | G06F 3/165 |
| 2018/0077443 A1* | 3/2018 | Lau | H04N 21/4126 |
| 2018/0096690 A1* | 4/2018 | Mixter | G06F 3/167 |
| 2018/0107446 A1* | 4/2018 | Wilberding | H04N 21/8113 |
| 2018/0233137 A1* | 8/2018 | Torok | G10L 15/22 |
| 2018/0310042 A1* | 10/2018 | Mayalil | H04N 21/41407 |
| 2019/0110091 A1* | 4/2019 | Guo | H04N 21/6543 |
| 2019/0124159 A1 | 4/2019 | Alsina et al. | |

FOREIGN PATENT DOCUMENTS

| | | |
|---|---|---|
| CN | 105493442 A | 4/2016 |
| CN | 106125567 A | 11/2016 |
| CN | 106796789 A | 5/2017 |
| KR | 2019-0044523 A | 4/2019 |

OTHER PUBLICATIONS https://www.w3.org/TR/2017/CR-remote-playback-20171019/#observing-remote-playback-device-availability, 24 pages.
U.S. Appl. No. 62/574,891, filed Oct. 20, 2017, Alsina et al.
U.S. Appl. No. 62/620,737, filed Jan. 23, 2018, Alsina et al.
U.S. Appl. No. 62/650,699, filed Mar. 30, 2018, Alsina et al.
U.S. Appl. No. 62/669,642, filed May 10, 2018, Alsina et al.

* cited by examiner

100

200

300

400

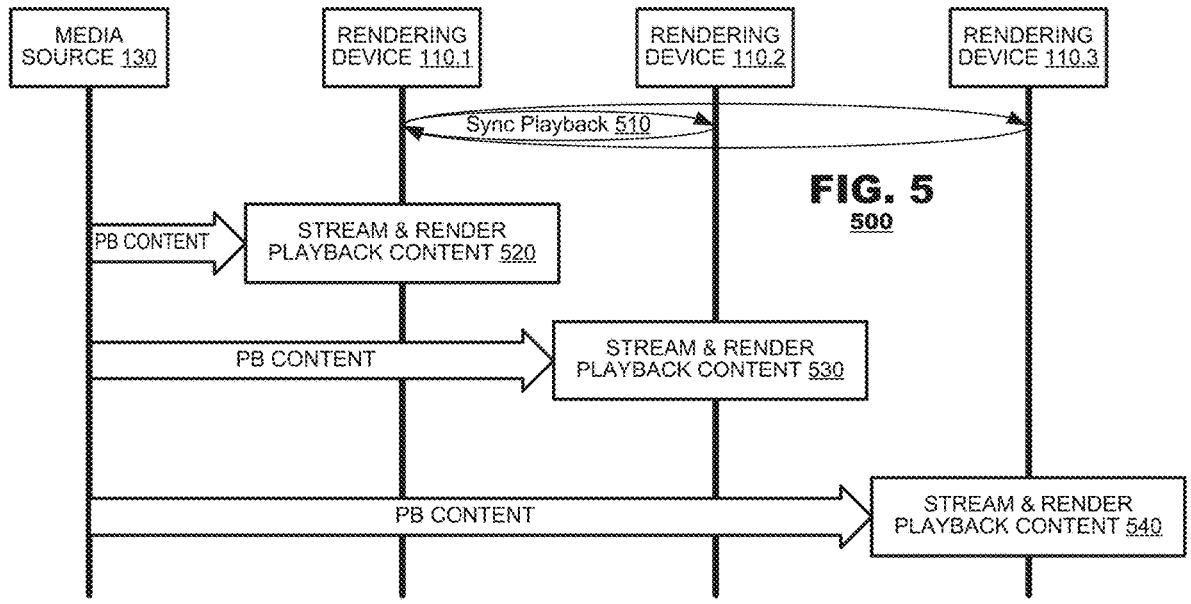
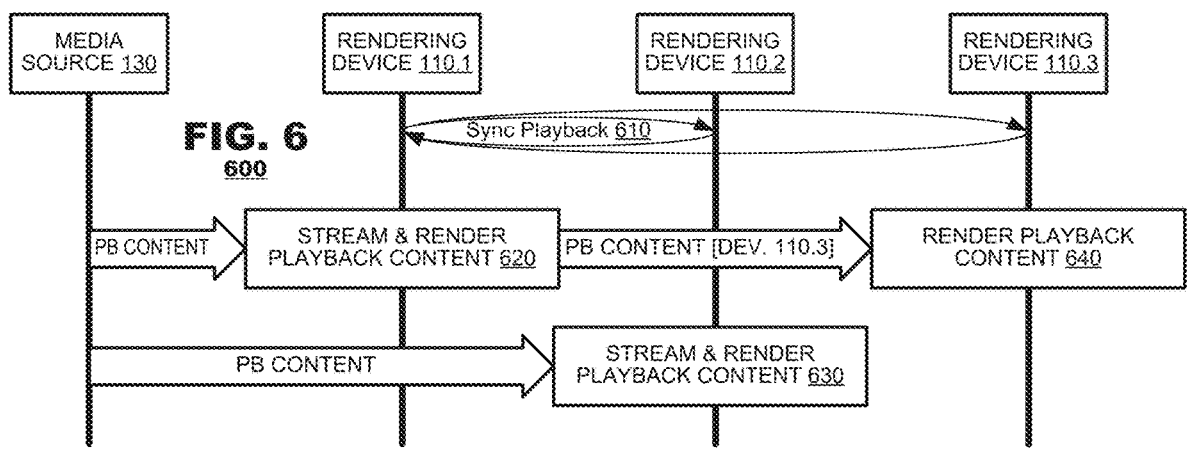

700

800

900

1000

1100

1200

1300

1900

2000

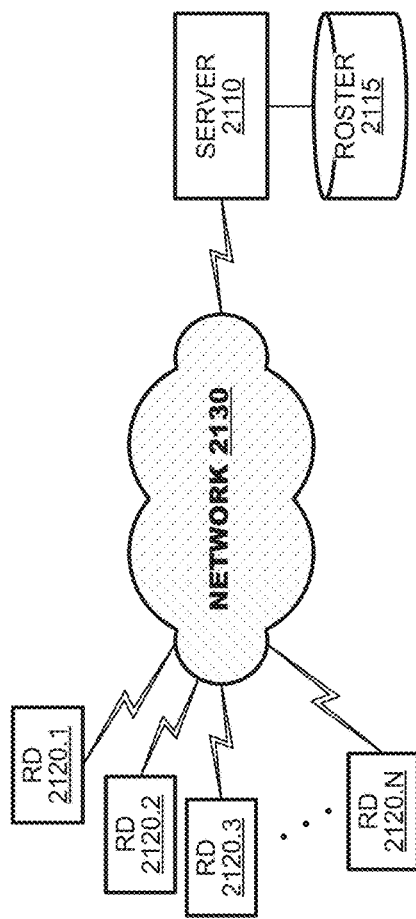
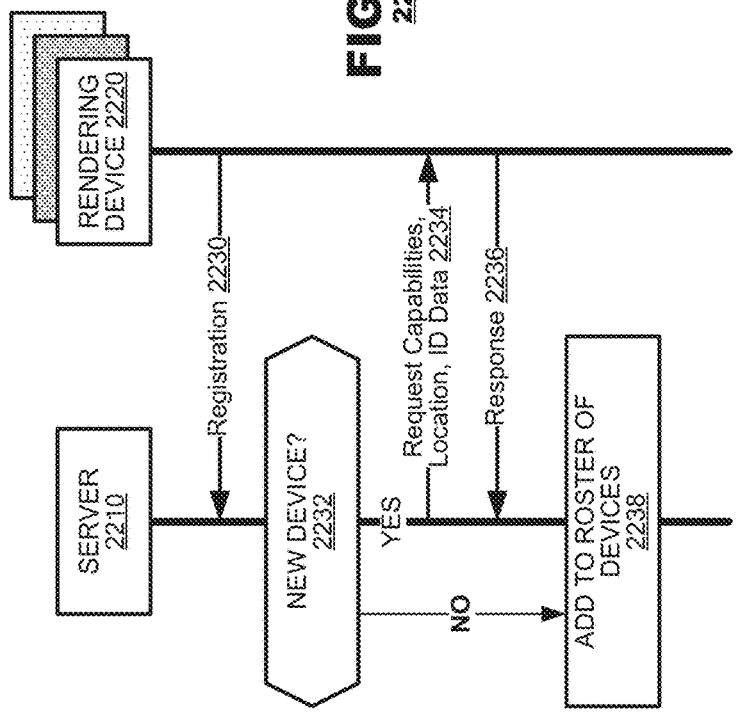

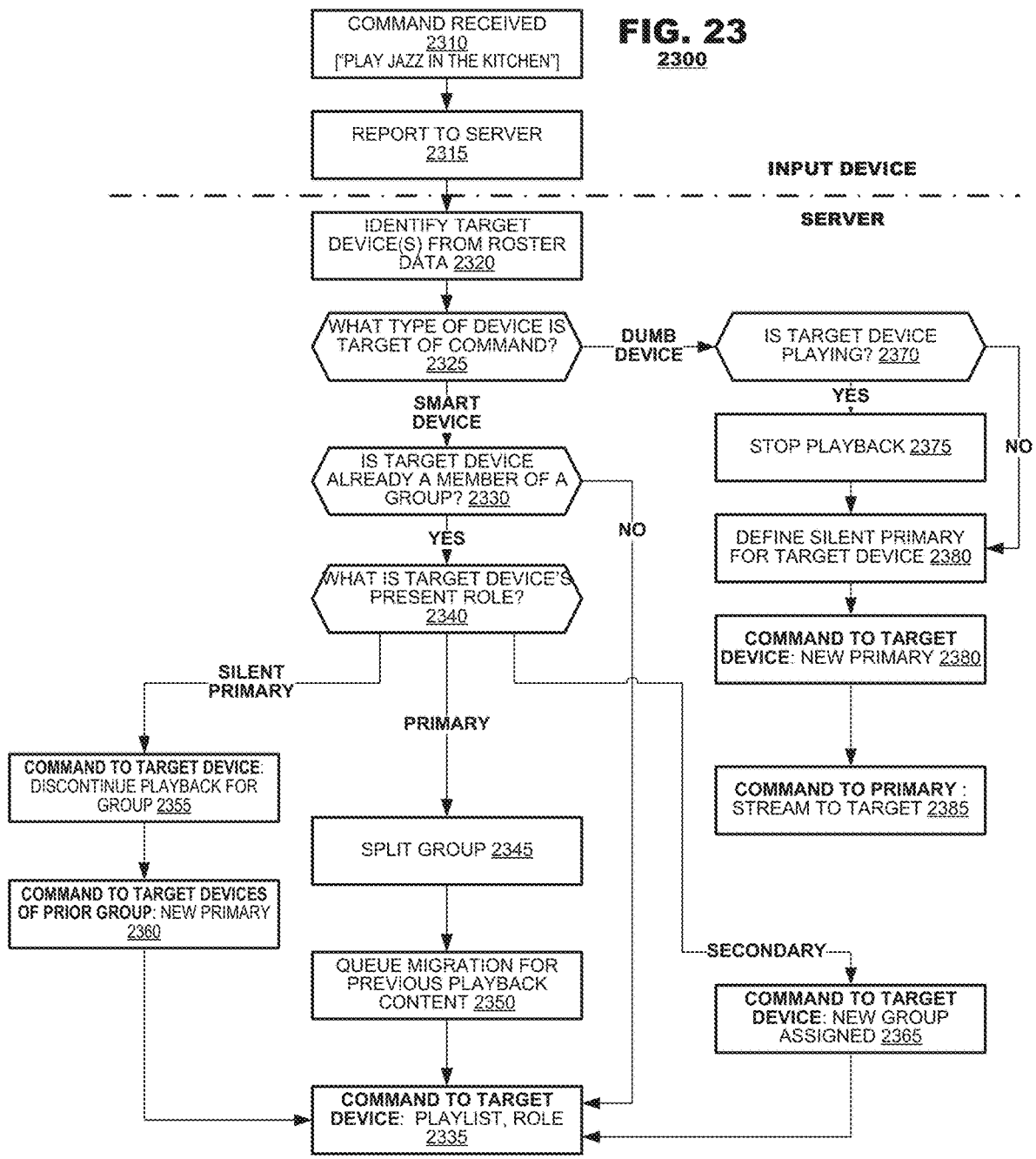

US 11,509,726 B2

ENCAPSULATING AND SYNCHRONIZING STATE INTERACTIONS BETWEEN DEVICES

CROSS REFERENCE TO RELATED APPLICATIONS

This application claims priority to U.S. Provisional Application No. 62/574,891 filed Oct. 20, 2017; U.S. Provisional Application No. 62/620,737 filed Jan. 23, 2018; U.S. Provisional Application No. 62/650,699 filed Mar. 30, 2018; and U.S. Provisional Application No. 62/699,642 filed May 10, 2018, the disclosures of which are incorporated by reference in their entirety.

BACKGROUND

The present disclosure relates to media playback operations and, in particular, to synchronization of playback devices that are grouped together for playback on an ad hoc basis.

Media playback devices are well-known in consumer applications. Typically, they involve playback of video or audio at a consumer device, such as a media player device (a television, an audio system). Recently, playback applications have expanded to include playback through networked devices, such as playback over a Bluetooth or WiFi network. In networked applications, playback typically involves streaming playback content from a first player device, such as a smartphone, to a connected rendering device. The first player device may not store the playback content itself; it may stream the content from another source.

BRIEF DESCRIPTION OF THE DRAWINGS

FIG. 5 is a signal flow diagram illustrating exemplary rendering of playback content according to an aspect of the present disclosure.

FIG. 6 is a signal flow diagram illustrating exemplary rendering of playback content according to another aspect of the present disclosure.

FIG. 21 illustrates a system according to another aspect of the present disclosure.

FIG. 22 illustrates a communication flow according to an aspect of the present disclosure.

FIG. 23 illustrates a session management method according to an aspect of the present disclosure.

DETAILED DESCRIPTION

Aspects of the present disclosure provide techniques for managing media playback among an ad hoc group of playback devices. Such techniques may involve building a session among the playback devices in which playback devices communicate information regarding their playback capabilities. Based on the playback capabilities of the devices, playback mode may be derived for the session. Playback operations may be synchronized among the devices that are members of the session, in which devices receive identification of asset(s) to be rendered pursuant to the playback operation and timing information of playback of the asset. The devices may stream the playback assets directly from media sources when they are capable of doing so. In this manner, communication resources are conserved.

Although media playback over ad hoc groups of networked devices are known, they tend to be inefficient. Such applications typically cause a first device in the group to stream playback content to each device in a group. When the first device retrieves the streamed content from another source, this leads to bandwidth inefficiencies in such applications because the first device retrieves, then retransmits content that will be rendered by other devices in the group. The techniques of the present disclosure, however, permit playback to be performed in a consistent manner across all devices of a session even when uplink bandwidth is constrained or when digital rights management ("DRM") constraints limit access to assets.

Figure 1:
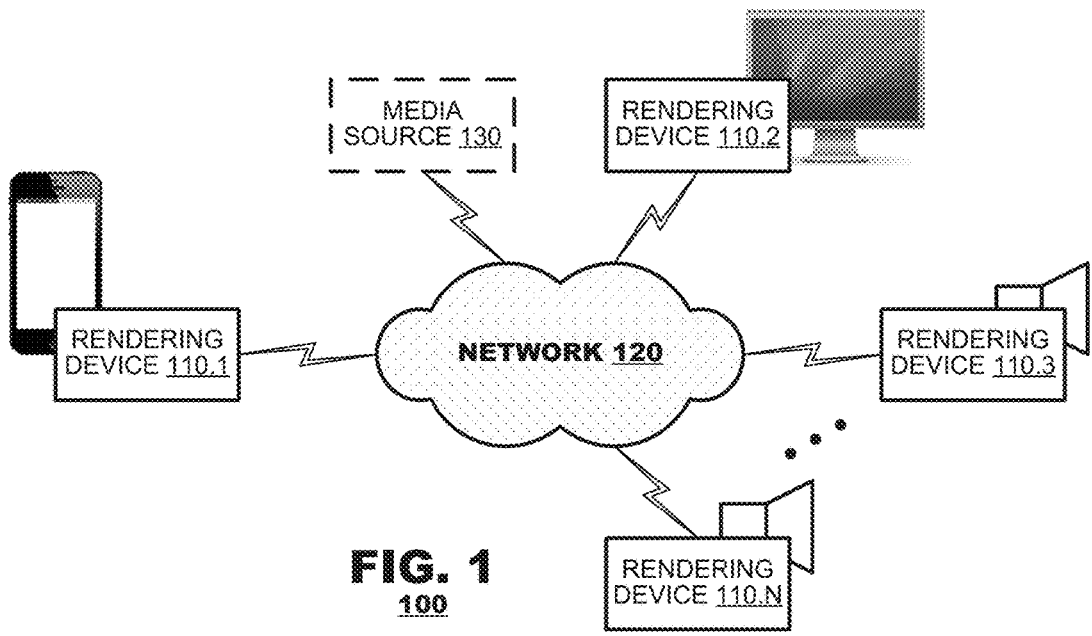
FIG. 1 illustrates a system according to an aspect of the present disclosure.

FIG. 1 illustrates a system 100 according to an aspect of the present disclosure. The system 100 may include a plurality of rendering devices 110.1-110.N provided in mutual communication via a network 120. The rendering devices 110.1-110.N may cooperate to render a media item in coordinated fashion.

During operation, one of the rendering devices (say, device 110.1) may operate in the role of a "master" device. The master device 110.1 may store data, called a "playback queue" for convenience, representing a playlist of media assets that are to be played by a group of rendering devices 110.1-110.N. The playback queue may identify, for example, a plurality of assets that will be played in succession, a current playback mode (for example, audio assets being played according to a "shuffle" or "repeat" mode), and the like. In other aspects, assets may identified on an algorithmic basis, for example as an algorithmic station, a streamed station, or, in the case of a third-party application, a data structure maintained by that application. The master device 110.1 may communicate with the other rendering devices 110.2-110.N to synchronize playback of the media assets.

The other rendering devices 110.2-110.N within the group, called "secondary" devices, may play the assets in synchronization. In one aspect, the devices 110.1-110.N each may stream assets directly from a media source 130 on a network. The secondary devices 110.2-110.N typically store data representing an asset currently being played and a timebase from which to synchronize rendering. In another aspect where a rendering device (say, device 110.3) does not have capability to stream assets from a media source 130, the master device 110.1 may stream the data directly to the non-capable rendering device 110.3. In another aspect, the master device 110.1 may decrypt and decode assets and then stream asset data (e.g., audio bytes) to the secondary devices, regardless of capabilities of the secondary devices.

The principles of the present discussion find application with a variety of different types of rendering devices 110.1-110.N. They may include smartphones or tablet computers, represented by rendering device 110.1; display equipment 110.2; and speaker equipment 110.1-110.N. Although not illustrated in FIG. 1, the principles of the present invention find application with other types of equipment such as laptop and/or personal computers, personal media players, set top boxes, disc-based media players, servers, projectors, wearable computers, embedded players (such as car music players), and personal gaming equipment.

The rendering devices 110.1-110.N may be provided in mutual communication by one or more networks, shown collectively as network 120. The network 120 may provide a communication fabric through which the various rendering devices 110.1-110.N discover each other. For example, in residential applications, the network 120 may provide a communication fabric through which rendering devices in a common home may discover each other. In an office application, the network 120 may provide a communication fabric through which the rendering applications in a common building, a common department and/or a common campus may discover each other. The architecture and/or topology of the networks 120, including the number of networks 120, is immaterial to the present discussion unless otherwise noted herein.

Figure 2:
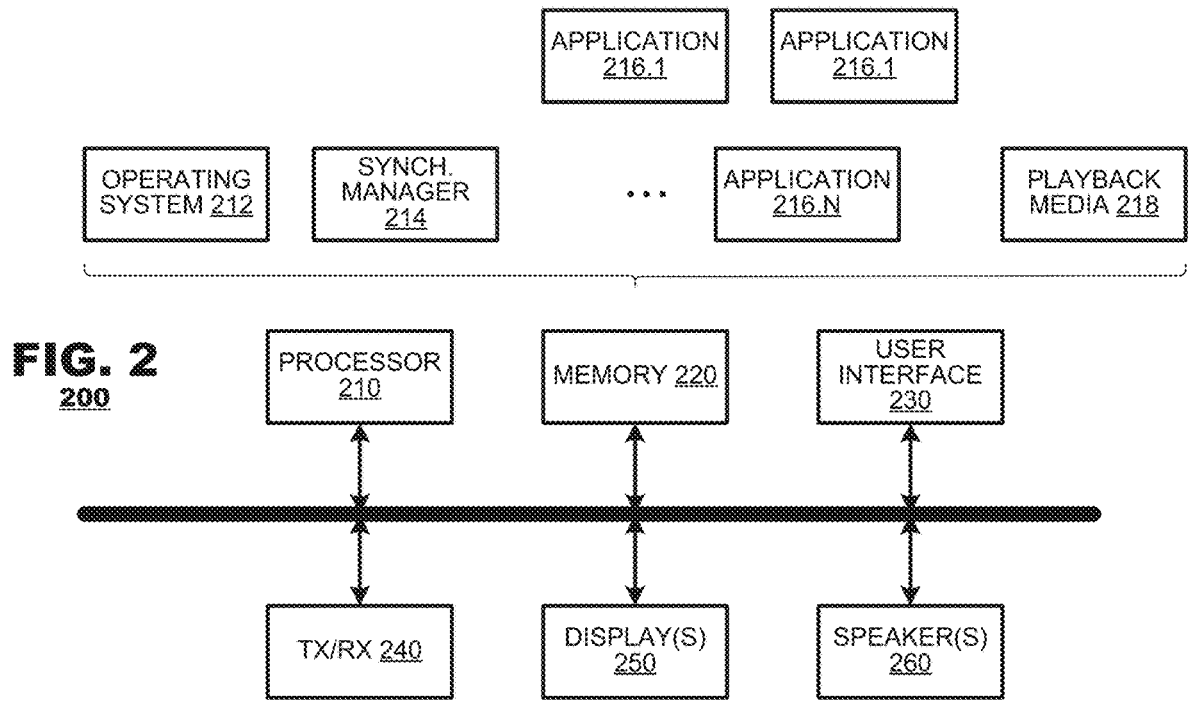
FIG. 2 is a block diagram of a rendering device according to an aspect of the present disclosure.

FIG. 2 is a block diagram of a rendering device 200 according to an aspect of the present disclosure. The rendering device 200 may include a processor 210, a memory 220, a user interface 230, a transceiver 240, and, as appropriate for the device's type, display(s) 250 and/or speaker(s) 260.

The rendering device may include a processor 210 that executes program instructions stored in a memory 220. The program instructions may define an operating system 212 of the rendering device 200; a synchronization manager 214 (discussed herein); various applications 216.1-216.N of the rendering device 200 involved in playback operations that can be performed by the rendering device 200 and counterpart rendering devices 110.1-110.N (FIG. 1); and optionally, playback media 218 to be rendered by the rendering device 200 and/or the counterpart rendering devices 110.1-110.N (FIG. 1).

The rendering device 200 also may include other functional units such as a user interface 230, a transceiver ("TX/RX") 240, display(s) 250 and/or speaker(s) 260. The user interface 230 may provide controls through which the rendering device 200 interacts with users. User interface components may include various operator controls such as buttons, switches, pointer devices and the like and various output components such as indicators, lights, speakers and/or displays.

The TX/RX 240 may provide an interface through which the rendering device 200 communicates with the network 120 (FIG. 1) and, by extension, other rendering devices and, as needed, media sources.

The display(s) 250 and/or speaker(s) 260 represent rendering components through which the device 200 may render playback content—video and/or audio—depending on the rendering device's type. The displays and speakers are illustrated as separate from the user interface 230 merely to emphasize playback operations that may be performed by the rendering device 200. In practice, the same displays and/or speakers that are involved in user interface operations also will be involved in playback operations.

As noted, the principles of the present disclosure involved synchronization of playback operations among a variety of rendering devices and, in particular, rendering devices of a variety of types. Accordingly, a given rendering device need not possess all of the components illustrated in FIG. 2. A speaker device, for example, need not include a display. A set top box device need not include a speaker or a display. Thus, some deviation from the block diagram of FIG. 2 can be expected when the principles of the present disclosure are placed into operation.

Figure 3:
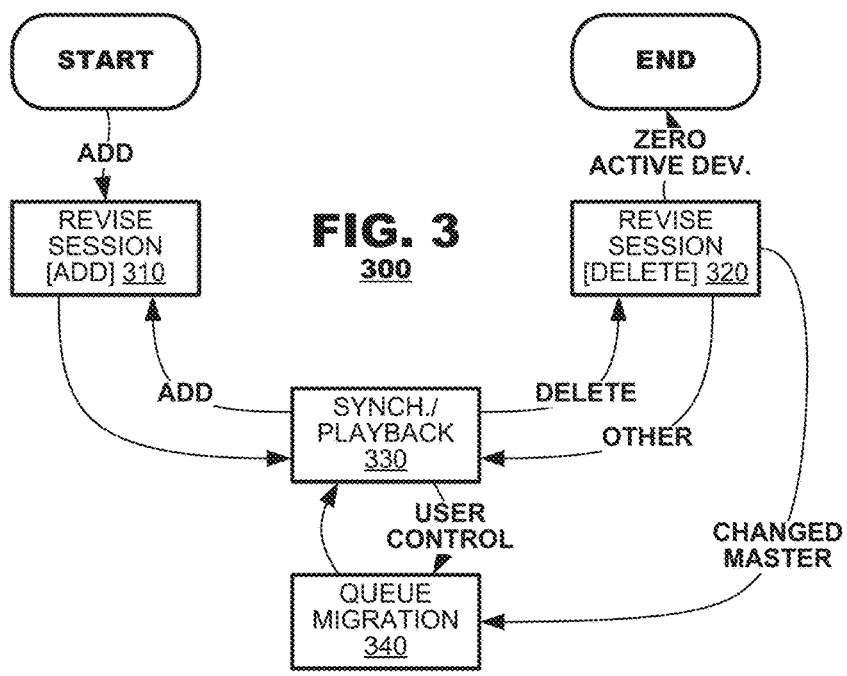
FIG. 3 is a state diagram illustrating progression of a synchronization session according to an embodiment of the present disclosure.

FIG. 3 is a state diagram illustrating progression of a synchronization session 300 according to an embodiment of the present disclosure. A synchronization session 300 may proceed according to several major stages including a session revision stage (shown separately as stages 310, 320), a synchronization/playback stage 330, and optionally, a queue migration state 340. A session revision stage may be entered either to add (stage 320) a rendering device to a synchronization session or to remove one from a session (stage 320). A synchronization/playback stage 330 represents an operational stage in which devices that currently are members of a common synchronization group exchange information about playback. A queue migration stage 340 may be entered to transfer state of a playback queue from one rendering device to another, effectively designating a new master for a group of devices.

A synchronization session 300 may be started by a first two rendering devices, perhaps more, to the session 300. Typically, the session is initiated from a first rendering device (say, device 110.1 of FIG. 1), which impliedly indicates that the rendering device 110.1 is to be included in the session. A second rendering device (say, device 110.2 of FIG. 1) may be identified.

From this identification, the session 300 may enter a revision state 310 to add the selected devices to the session 300. The devices 110.1, 110.2 may engage in mutual communication to negotiate a playback mode that is to be used for rendering. Once the negotiation is complete, the devices may enter a synchronization/playback state 330 during which devices that are members to the session exchange information for rendering.

The session may advance to other states in response to other control inputs. For example, if an input is received to add another device (say, device 110.3) to the session 300, the session 300 may return to state 310 where a master device (say, device 110.1) negotiates a playback mode to be used for rendering with the new device 110.3.

If an input is received to delete a device from the session 300, the session 300 may advance to another revision state 320 where an identified device (say, device 110.3) is removed from the session. In this state, a master device 110.1 may communicate with the device 110.3 that is to be removed to terminate the device's membership in the session. The device 110.3 should terminate rendering.

The session 300 may advance to several other states when a device is deleted from a session 300. Deletion of a device may decouple the last two devices (e.g., devices 110.2 and 110.3) to a session (meaning, there is no group of devices in a session), which may cause the session 300 to end.

In another use case, the device being deleted may be the "master" device to a session. In this case, deletion of a master device may cause the session to enter a queue migration state 340, in which a new master device is selected from the devices that remain in the session and playback queue information is transferred to the newly-selected master. Once the new master is selected, the session 300 may return to the synchronization/playback state 330.

In another aspect, queue migration may be performed in response to operator control. For example, an operator may interact with a device that is not acting currently as a master device. The operator may engage controls to alter the playback session, for example, by changing a playback mode or playback assets (e.g., switching from one asset playlist to another). In response, devices within the session may advance to the queue migration state 340 to transfer the queue to the device with which the operator is interacting, then return to the synchronization/playback state 330 once the operator engages the new playback mode.

In a further aspect, deletion of a device 320 and, if needed, queue migration 340 may be performed in response to a device failure. Exchange of synchronization information may involve transmission of messages among devices within a session. If messages are not received from a given device over a predetermined period of time, it may be interpreted by other devices as a device failure. In response, the session may advance to state 320 to delete the failed device from the session and, if the failed device is the master device, to perform queue migration in state 340.

Figure 8:
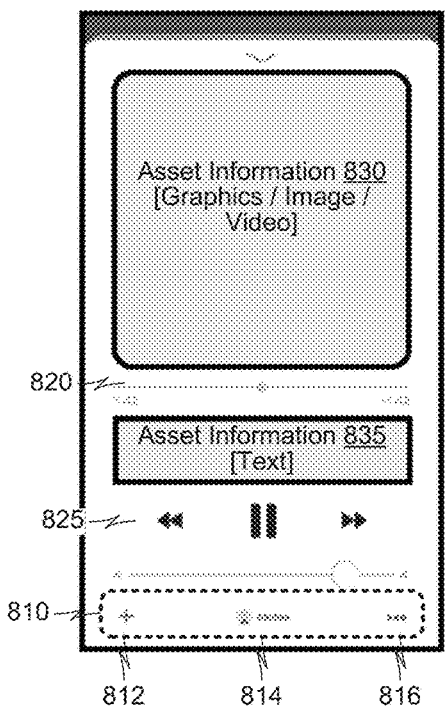
FIG. 8 illustrates an exemplary user interface that may be presented in a display-capable device according to an aspect of the present disclosure.
Figure 9:
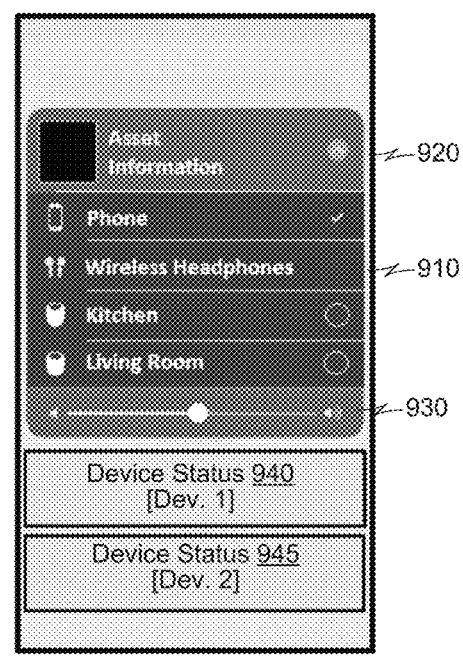
FIG. 9 illustrates an exemplary user interface for managing devices in a session.

Typically, a playback session may be supported by various user interface components at the devices. Some exemplary user interfaces are illustrated in FIGS. 8 and 9. In an aspect, state changes may be implemented as atomic transactions before updating the user interfaces. In this manner, user interfaces may be refreshed periodically during operation of the synchronization/-playback state 330, which simplifies presentation of the user interface.

If neither a termination event nor a queue migration event is triggered, the session 300 may move back to the synchronization/playback state 330 upon completion of a session revision at state 320.

Figure 4:
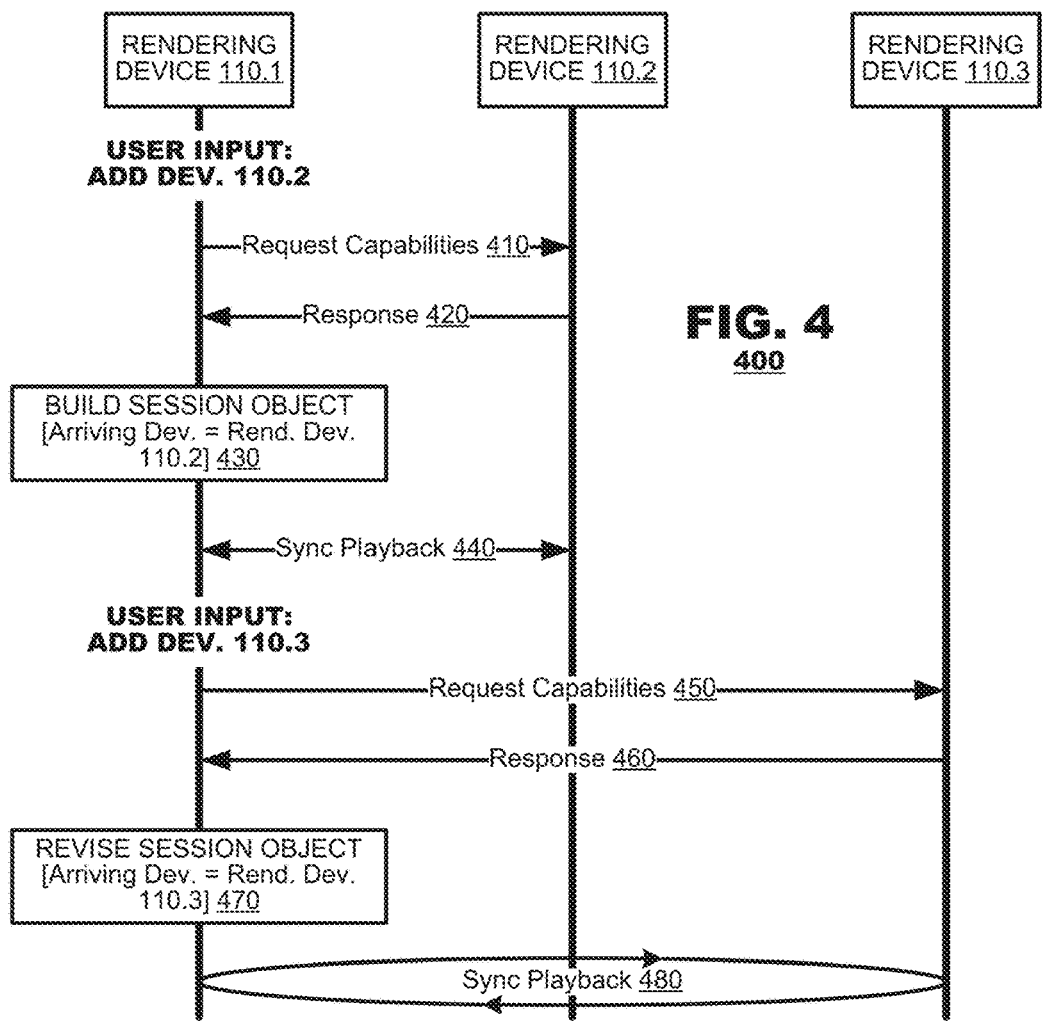
FIG. 4 is a signal flow diagram illustrating an exemplary process of adding devices to a session according to an aspect of the present disclosure.

FIG. 4 illustrates signal flow 400 among devices to add devices to a session 300 (FIG. 3) according to an aspect of the present disclosure. In this example, two rendering devices 110.2, 110.3 are added to a session from a first rendering device 110.1 that manages the session.

As indicated, a session 300 may be started by adding two devices to the session—here, devices 110.1 and 110.2. In response to user input that indicates device 110.2 is to be added to a session, the rendering device 110.1 may transmit a message to rendering device 110.2 requesting its playback capabilities (msg. 410). The rendering device 110.2 may respond (msg. 420) by providing information regarding its playback capabilities.

The device 110.1 may build a session object that identifies devices 110.1 and 110.2 as members of the session and that identifies various features of the playback rendering operation that is to be performed (box 430). Thereafter, the rendering devices 110.1, 110.2 may exchange synchronization information (msg. 440) regarding the playback rendering operation.

Synchronization information may include information that describe both the devices' types and rendering modes that are supported by the device. For example, devices may identify themselves as video-capable, audio-capable or both. Devices may identify playback applications that are supported (for example, ITunes, Spotify, Pandora, Netflix, and the like) and, where applicable, account identifiers associated with such information.

From such information, a master device may build a session object that identifies assets to be rendered, timing information of the assets and other playback mode information (for example, applications to be used for rendering). State information from the session object may be distributed to other device(s) to the session throughout its lifecycle.

Playback rendering operations may vary with the types of media that are to be played by the rendering devices 110.1, 110.2 and, therefore, the types of synchronization information may vary as well. Consider the following use cases:

Rendering Devices 110.1, 110.2 Both Play from a Music Playlist.

In this case, the master device may store data representing a playback queue, for example, the audio assets that make up the audio playlist, any content services (for example, iTunes) through which the audio assets are accessed, playback modes (e.g., shuffle, order of play) and the like. In one aspect, the synchronization information may identify an asset that is being played (for example, by URL and digital rights management tokens), timing information for rendering the music assets, and roles of the devices 110.1, 110.2 (e.g., whether the devices play the entirety of the asset or a specified channel—left, right—of the asset). The rendering devices 110.1, 110.2 may use this information to acquire the music assets identified in the playlist and render them in synchronization. Alteration of a playback mode (e.g., jump to previous track, jump to next track, shuffle) may cause new synchronization information to be transmitted among the devices.

In another aspect, synchronization information may identify a content service being used and a handle (perhaps user ID, password, session ID) identifying service parameters through which the service is being accessed and any parameters of the devices' respective roles in playback (e.g., video, audio, audio channel, etc.). In such a case, the rendering devices 110.1, 110.2 may authenticate themselves with a server 130 that supports the content service. The server 130 may maintain information regarding the assets being played, order of playback, etc. and may provide the assets to the devices directly.

Rendering Devices 110.1, 110.2 Both Play a Common Audio-Visual Asset.

In this case, the master device may store data representing the playback queue, for example, the video and audio components from the asset that will be rendered, any content service through which the asset is accessed, and playback settings. Many audio-visual assets may contain multiple video components (for example, representations of video at different screen resolutions and/or coding formats, representations of video at different visual angles, etc.) and multiple audio components (for example, audio tracks in different languages). The synchronization information may identify an asset component to be rendered by each device in a group, and timing information for rendering the respective components (e.g., reference points among a timeline of the asset). The rendering devices 110.1, 110.2 may use this information to acquire components of the audio-visual asset that are relevant to the devices' respective types. For example, a display device may acquire a video portion of an asset that is consistent with the display's configuration and a speaker device may acquire an audio portion of the asset that is consistent with rendering settings (e.g., an English audio track or a French audio track as may be specified by playback settings).

As indicated, queue migration (state 340) may be performed when a new master device is selected. Selection of a new master device may be performed following exchange of messaging among devices, and may be performed in a variety of ways. In a first aspect, individual devices to a session may be incapable of serving as master devices, for example, because they are feature-limited devices. Thus, based on device capability, devices may be excluded from being candidates to operate as a master device. Among candidate devices, a master device may be selected based on characteristics of the device. For example, devices may vary based on whether they are battery-operated or line-powered, based on their connectivity bandwidth to the network 120, based on their loading (for example, whether they are close to their thermal limits), based on characteristics such as frequency of interruption to handle other tasks.

Selection of a master device may be performed in response to one or more of these factors, with preference given (optionally) to factors that indicate higher reliability. For example, line-powered devices may be determined to be more reliable than battery-operated devices. Devices that are operating near their thermal limits may be determined to be less reliable than devices that are not. Devices with higher bandwidth connectivity may be deemed more reliable than devices with low bandwidth. Devices that are infrequently interrupted may be deemed more reliable than devices that are interrupted at higher rates. Selection of a new master device may be derived from consideration of these factors, either in isolation or collectively.

FIG. 4 also illustrates operations to add another device 110.3 to a session. Here, the session is shown as being added to the session in response to user input at the rendering device 110.1. The rendering device 110.1 may transmit a message to rendering device 110.3 requesting its playback capabilities (msg. 450). The rendering device 110.2 may respond (msg. 460) by providing information regarding its playback capabilities.

The device 110.1 may revise the session object to add device 110.3 (box 470). In the illustrated example, the session object would identify devices 110.1, 110.2 and 110.3 as members of the session. It also would identify various features of the playback rendering operation that is to be performed. These features may change from the features identified in box 430 based on overlap in capabilities of the devices 110.1, 110.2 and 110.3. Thereafter, the rendering devices 110.1, 110.2 and 110.3 may exchange synchronization information (msg. 480) regarding the playback rendering operation.

FIG. 5 is a signal flow diagram illustrating exemplary rendering of playback content pursuant to a session 300 (FIG. 3) according to an aspect of the present disclosure. In this example, three rendering devices 110.1-110.3 are members of a common playback session.

In this playback example, each of the rendering devices have capability to playback media content using a common application. Thus, each rendering device 110.1-110.3 streams its respective playback content from a media source 130 via a network and renders the playback content independently of the others, represented by boxes 520, 530 and 540. In this example, the rendering devices 110.1-110.3 communicate with each other to synchronize playback (msgs. 510) but they acquire the playback content that will be rendered through independent communication processes with the media source 130.

FIG. 6 is a signal flow diagram illustrating exemplary rendering of playback content pursuant to a session 300 (FIG. 3) according to another aspect of the present disclosure. In this example, three rendering devices 110.1-110.3 are members of a common playback session.

In this playback example, the rendering devices do not have common capability to playback media content using a common application. Devices 110.1 and 110.2 have a capability to acquire their respective playback content from a media source 130 but not device 110.3.

In this example, rendering devices 110.1, 110.2 streams their respective playback content from a media source 130 via a network and renders the playback content independently of the others, represented by boxes 620 and 630. One of the devices (device 110.1 in this example) may acquire content for the rendering device 110.3 and transmit the playback content to the rendering device 110.3 (box 640). Thus, the rendering device 110.3 acquires its content from another device 110.1 in the session rather than from the media source.

In some applications, a rendering device 110.3 may not have the capability to render content in a given playback mode due to digital rights management (DRM) issues. For example, if an attempt is made to add a device to an ongoing session that does not have rights to participate in a currently-active playback mode (for example, because the device to be added does not have an account with a media source from which content is being played), then several outcomes are possible. In one case, the non-capable rendering device may not be added. In another case, an alternate playback mode may be derived to play the same assets as in the current playback mode (by, for example, switching to an alternate application for which the new device does have access rights).

Figure 7:
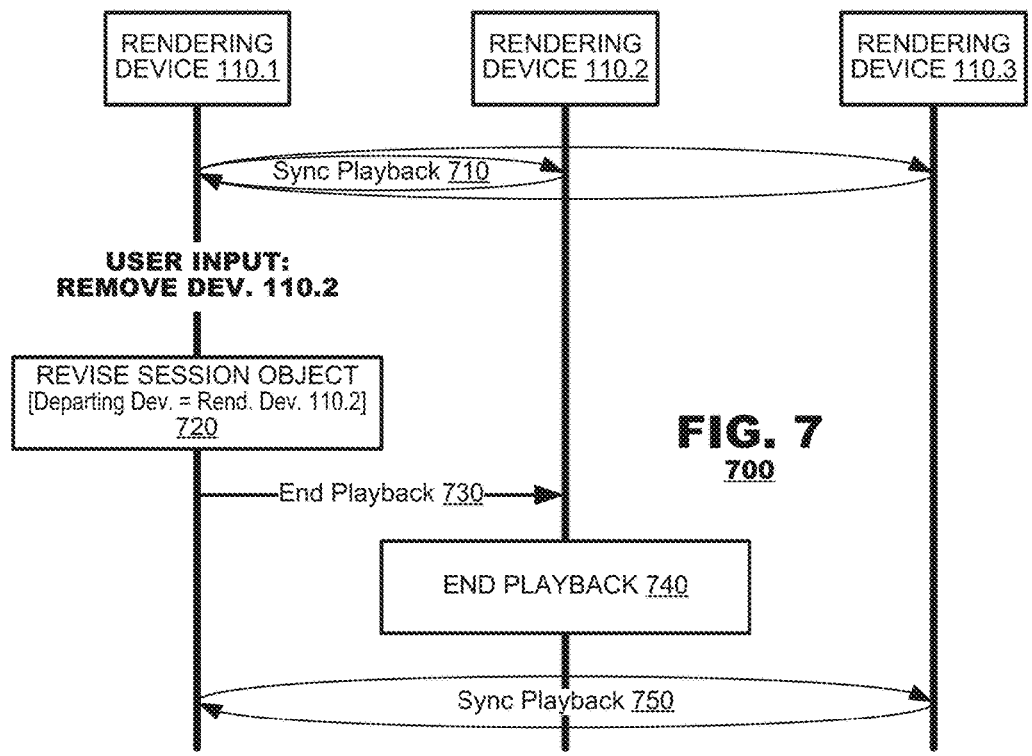
FIG. 7 is a signal flow diagram illustrating an exemplary process of removing a rendering device from a session according to another aspect of the present disclosure.

FIG. 7 is a signal flow diagram illustrating an exemplary process of removing a rendering device 110.2 from a session 300 (FIG. 3) according to another aspect of the present disclosure. In this example, three rendering devices 110.1-110.3 are members of a common playback session at the outset. In this example, the three devices 110.1-110.3 may engage in periodic synchronization communications (msg. 710) to synchronize playback among the devices.

At some point, user input may be received indicating that a device 110.2 should be removed from the session. In response, a master device (here, device 110.1) may revise a session object to identify the device 110.2 as a departing device. The master device 110.1 may transmit a message 730 to the departing device 110.2 indicating that the device is to end playback. The rendering device 110.2 may end its playback (box 740) in response. Thereafter, synchronization messages 750 involving playback will be exchanged among the devices 110.1, 110.3 that remain in the session.

In another aspect, removal of a device may be initiated at the device being removed. In this event (not shown), the device being removed may terminate its playback and transmit a message to the master device notifying the master of the device's removal.

Although the foregoing discussion has presented session management functions as controlled by a common device (device 110.1), the principles of the present discussion are not so limited. Thus, the principles of the present discussion find application where different devices change session state (FIG. 3). Thus, adding a device to a session (state 310) may be initiated by any device, including the device to be added to a session. Similarly, deleting a device from a session (state 320) may be initiated by any device, either the master device or a secondary device. Queue migration, as discussed, may be initiated by user control or by an event that removes the master device from a session.

As an illustrative example, consider an arrangement where a secondary device joins an existing session in which another device already is active as a managing device. This may occur for example, where a session is managed by a smart speaker 110.3 (FIG. 1), a speaker device that manages a playback session for a group of devices in a residence. A user may add his/her smartphone 110.1 to the session. In this case, the smartphone 110.1 may initiate an operation to join itself to the session (state 310, FIG. 3). It may take a role of a secondary device initially and may begin rendering media assets (say, video content, image content) associated with the media asset being played. Eventually, the user may engage playback control operations through the smartphone 110.1, which may cause a queue migration event that transfers playback queue information to the smartphone 110.1 (state 340). And, further, the user may remove the smartphone 110.1 from the session (state 320), which may cause a second queue migration event (state 340) to transfer the playback queue information to another device in the session—perhaps back to the smart speaker 110.3.

Alternatively, after a queue migration event that causes the smartphone 110.1 to become a master device, the user (or another user) may engage playback control operations through the speaker 110.3. In such a case, another queue migration event (state 340) may occur, transferring the playback queue information to the smart speaker.

Queue migration need not be performed in all cases where users enter commands through connected devices. In other embodiments, devices that are members to a group may share remote control user interfaces that display to users at those devices information regarding an ongoing playback session. Such remote control displays may allow users to enter commands that, if not entered at a master device, may be communicated to the master device to alter a playback mode. Queue migration need not occur in these use cases.

FIG. 8 illustrates an exemplary user interface 800 for session 300 (FIG. 3) management that may be presented in a display-capable device according to an aspect of the present disclosure. The user interface 800 may include controls 810 for managing device membership in a session, controls 820, 825 to manage playback of assets in a playback session, and regions 830, 835 for rendering of asset information.

The controls 810 may include controls for adding or deleting devices from a session. In the example of FIG. 8, the control region 810 includes a first control 812 for adding a device, a second control 814 displaying device(s) currently in a session, and a third control 816 for accessing other session management controls.

The controls 820, 825 may control asset playback. In the illustrated example, they include play/pause controls, controls that skip playback either back to a prior asset or forward to a next asset, volume controls, and controls to jump playback to a designated position along an asset's playback timeline. Although not illustrated in FIG. 8, controls also may be invoked to change a playback mode (e.g., normal play, shuffle, repeat), to change playlists, to change services through which media is received, to change user accounts through which media received, etc. Moreover, user controls may be provided that are specific to the type of asset being rendered with a different set of user controls being provided for audio assets than for video assets.

The regions 830, 835 may provide display either of asset content or metadata about the content. For audio information, it may include graphical images and/or textual information associated with the audio being rendered (e.g., artist images, artwork, track names, etc.) For video, it may include video data of the asset itself.

FIG. 9 illustrates an exemplary user interface 900 for managing devices in a session 300 (FIG. 3). In this example, the user interface 900 may include a control region 910 for adding and/or deleting devices from a session, it may include other regions 920, 930, 940-945 for display of other information. For example, a region 920 may display information about a playback mode of the session. Region 930 may provide user controls for managing playback. Regions 940-945 may display indicators of status for other devices that are not members of the session but may be added.

Figure 10:
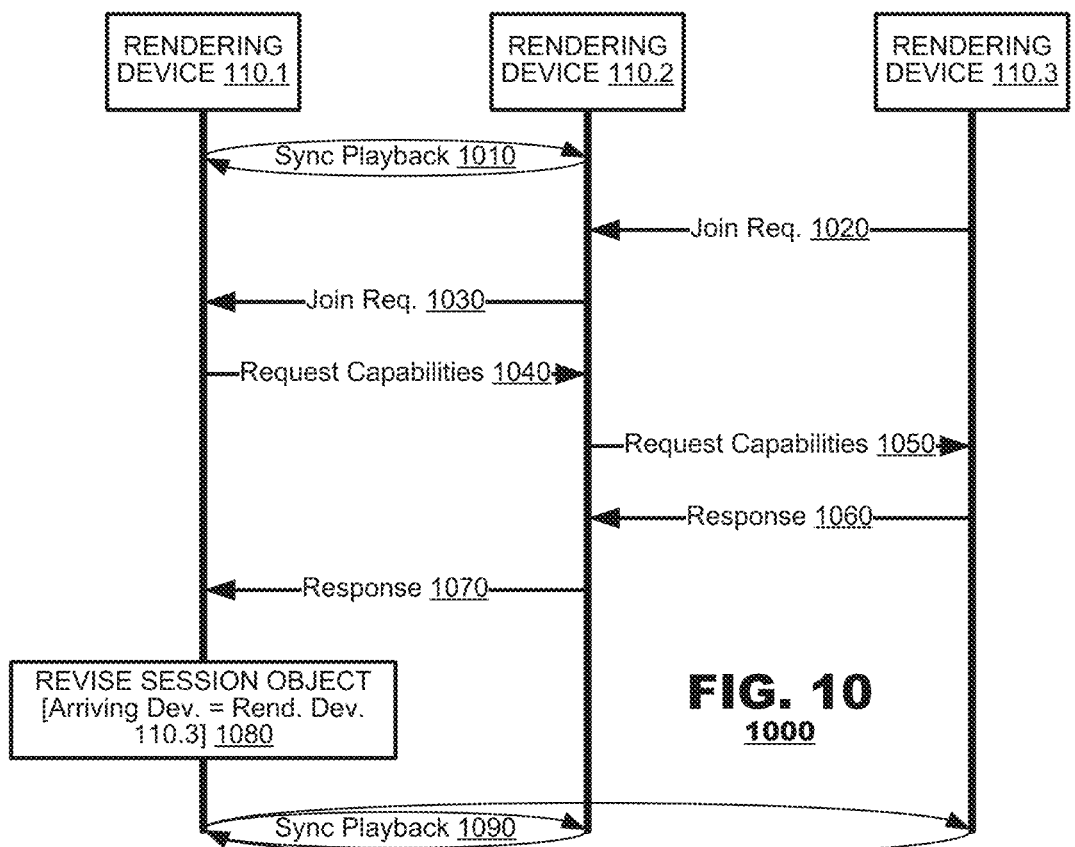
FIG. 10 is a signal flow diagram illustrating exemplary group management of playback content according to an aspect of the present disclosure.

FIG. 10 is a signal flow diagram illustrating exemplary group management of playback content according to an aspect of the present disclosure. The techniques illustrated in FIG. 10 find application in a circumstance where new device (here, rendering device 110.3) attempts to join a session 300 (FIG. 3) in progress but is prevented from discovering the master device 110.1 of a group of session devices, for example, by user permissions or other constraints that prevent direct communication between the devices. Assume, for purposes of discussion, that the joining device 110.3 can discover and communicate with another member of the group. In the example of FIG. 10, the joining device 110.3 can communicate with device 110.2.

In this example, playback synchronization 1010 is performed between the two devices 110.1, 110.2 that are members of the group. The joining device 110.3 may transmit a request to join the group (msg. 1020) to the non-master device 110.2. In response, the non-master device 110.2 may relay the join request message to the master device 110.1 (msg. 1030). The master device may request the capabilities of the joining device 110.3 via communication to the non-master device 110.2 (msg. 1040), and the non-master device 110.2 may relay the communication to the joining device 110.3 (msg. 1050). The joining device 110.3 may identify its capabilities to in a response message (msg. 1060), which is transmitted to the non-master device 110.2 and relayed to the master device 110.1 (msg. 1070). The master device may revise a session object that identifies the rendering device 110.3 as an arriving device (box 1080). Thereafter, playback synchronization 1090 may be performed between the three rendering devices 110.3.

The embodiment of FIG. 10 may find application with so-called "dumb devices," devices that do not have functionality to act as master devices in group administration. Thus, in the aspect illustrated in FIG. 10, the rendering device 110.2 may relay group management messages between other devices even in circumstances where the rendering device 110.2 does not have capability to perform session management operations itself.

Figure 11:
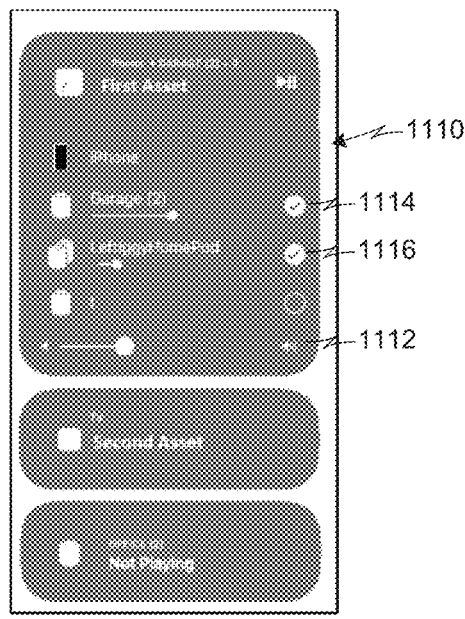
FIG. 11 illustrates an exemplary user interface for managing devices in a session.

In another aspect, where dumb devices are involved, master devices may supply user interface controls for such devices that provide group controls as well as controls that would apply only to the device locally. FIG. 11 illustrates an exemplary user interface 1100 for managing devices in a session 300 (FIG. 3). In this example, the user interface 1100 may include a control region 1110 for controlling devices within a session. It may include a first control 1112, shown as a slider, for controlling playback volume for all devices in a current session. It may include other controls 1114, 1116 for controlling playback volume of session devices on an individual basis. One such control, say control 1114, may control the device locally.

In response to user interaction with the local control 1114, a device may perform action directed by the user input directly. Thus, in response to interaction with a volume control, a rendering device may alter its volume output accordingly. In response to interaction with a control representing either the session group as a whole or another device, a rendering device may report the user input to the master device, which will issue volume control commands to other devices in the session.

In another aspect, session devices may perform operations to emulate queue migration in circumstances where conventional migration is not possible. Consider a circumstance where a session is in place that includes both fully capable rendering devices (devices that can act as masters) and other, dumb devices (devices that cannot act as masters). In such an implementation, a master device may provide to the dumb devices user interfaces that present session management functionality. It may occur that a user controls the session to remove a current master from a session, which would move queue management responsibility to another dumb device. In such circumstances, session devices can respond in a variety of ways:

In one aspect, the master device may search for other devices in the session (other than the dumb device), that can serve as a master. If one is found, queue migration may be performed to transfer queue management responsibility to the other capable device.

In another aspect, the master device may retain queue management responsibility. It may mute itself to emulate removal from the session yet still perform queue management operations.

Figure 12:
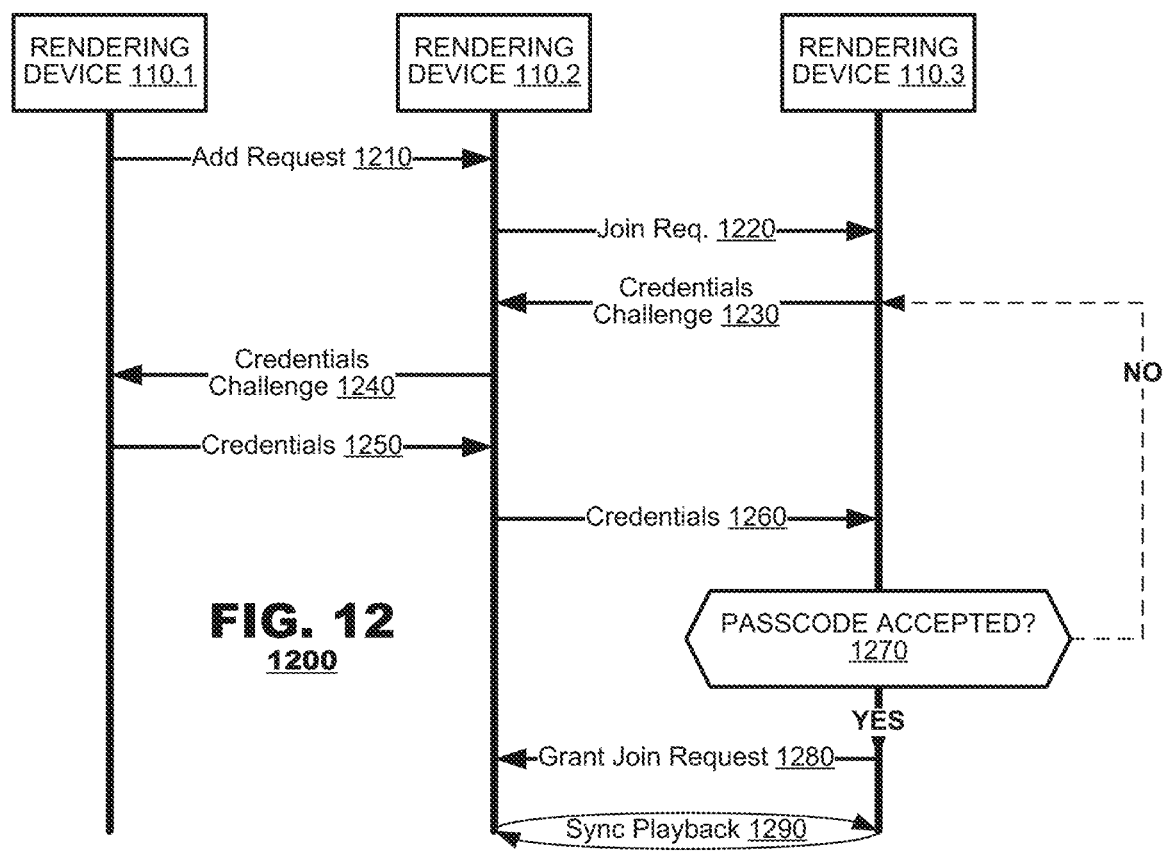
FIG. 12 is a signal flow diagram illustrating exemplary group management according to another aspect of the present disclosure.

FIG. 12 illustrates a communication flow 1200 for session 300 (FIG. 3) management according to another aspect of the present disclosure. FIG. 12 finds application in circumstances where queue management is performed by a first device (here, rendering device 110.2) and users attempt to add a device (rendering device 110.3) that operates according to access control privileges.

In the communication flow 1200 an add request is entered at a rendering device 110.1 that indicates rendering device 110.3 should be added to a session; the add request (msg. 1210) is communicated to the queue manager, rendering device 110.2. In response, the rendering device 110.2 may send a join request message (msg. 1220) to the rendering device 110.3. The rendering device 110.3 may respond with a credentials challenge (msg. 1230) that is sent to the queue manager, rendering device 110.2. In response, the rendering device 110.2 may pass the credentials challenge to the rendering device 110.1 from which the add request was received (msg. 1240). The rendering device 110.1 may provide credentials to the queue master 110.2 (msg. 1250), which the queue master 110.2 relays to the rendering device 110.3 that is to be joined. Assuming the credentials are accepted (box 1270), the rendering device 110.3 to be joined may communicate a response message (msg. 1280) that grants the join request. Playback synchronization 1290 may be performed between the rendering devices 110.2 and 110.3.

The principles of the present disclosure find application in networked environments where associations among devices may be created based on device location. In a residential application, player devices may be associated with individual rooms of a house—e.g., kitchen, living room, etc. In a commercial application, player devices may be associated with individual meeting rooms, offices etc. Portable devices often operate according to protocols that automatically discover devices in nearby locations. In such applications, identifiers of such devices may be populated automatically in the control region 910 to permit operators to add and delete devices to a session.

In an aspect, devices may be configured to be added to and deleted from sessions automatically. For example, an audio player in a smartphone may automatically build a session with an embedded player in a car when it detects the player (for example, because the car is turned on). The playback session may render media through the car's audio system automatically when the session is joined. If the smartphone detects loss of contact with the embedded audio player because, for example, the car is turned off, it may deconstruct the session. Moreover, it may join to other devices, for example, home audio components, if/when it detects those devices at later points in playback. In this manner, the principles of the present disclosure may create a playback experience that causes playback to "follow" and operator as that person moves through his/her daily life.

Figure 13:
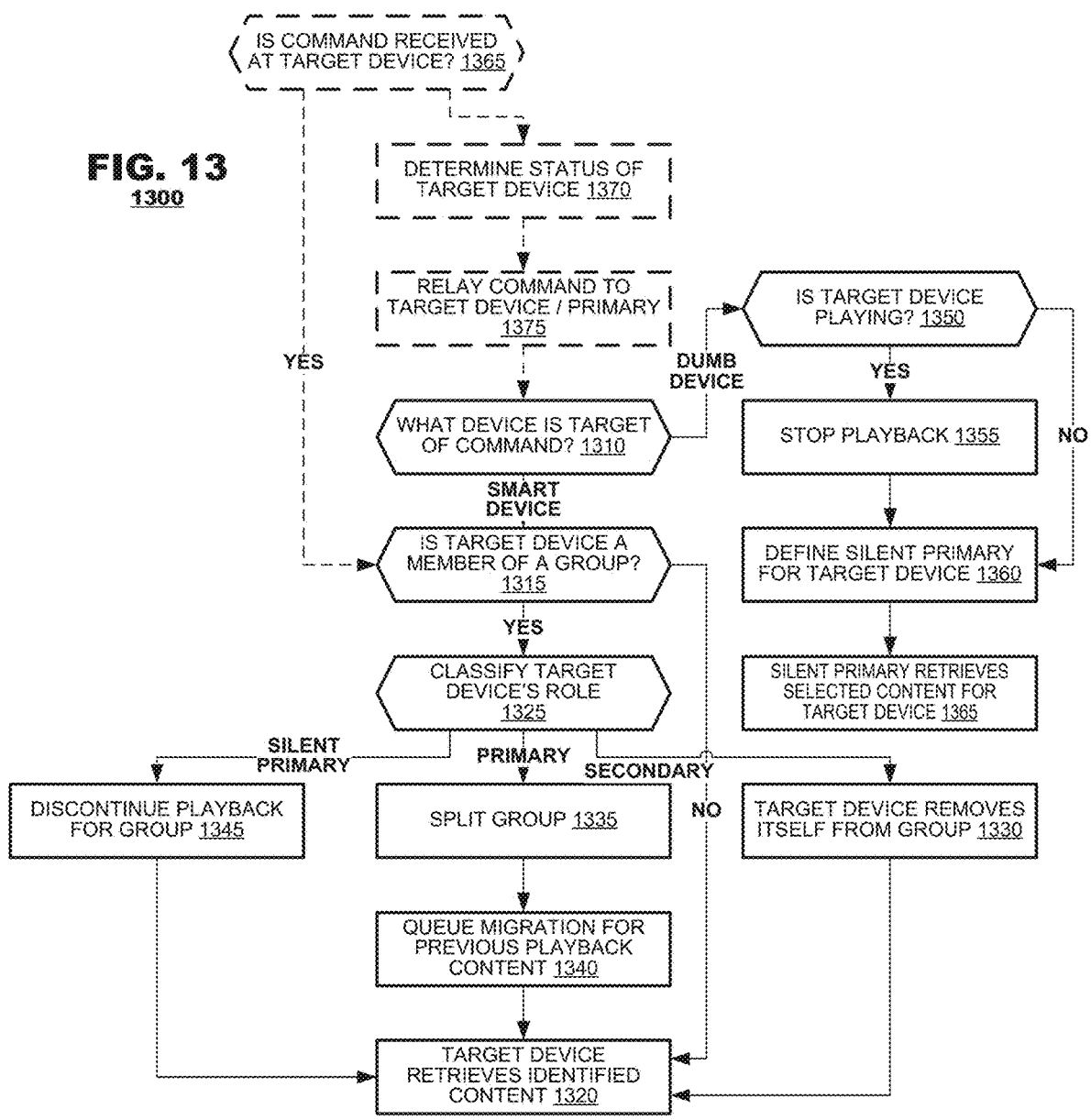
FIG. 13 illustrates a method according to an aspect of the present disclosure.

FIG. 13 illustrates a method 1300 for session 300 (FIG. 3) management according to an aspect of the present disclosure. The method 1300 may be invoked in response to a command that identifies an action to be taken upon a target device, such as "play jazz in the kitchen." In response to such a command, the method 1300 may classify the device that is the target of the command (e.g., a kitchen media player). The target device may be classified either as a smart device or as a dumb device.

When the target device is classified as a "smart device", the method 1300 may determine whether the target device is a member of a playback group (box 1315). If not, then the target device may retrieve the selected content and begin rendering (box 1320).

If, at box 1315, the target device is determined to be a member of the playback group, the method 1300 may determine the role of the target device (box 1325), either as a primary of the group, a secondary of the group or a "silent primary" of the group. When the target device is classified as a secondary, the method 1300 may cause the target device to remove itself from the group (box 1330) and become a primary for itself in a new group. Thereafter, the method 1300 may advance to box 1320 and the target device may render the identified content.

If, at box 1325, the target device is classified as a primary, the method 1300 may cause the group to be split (box 1335). Splitting the group may remove the target device from the previously-defined group and permit the previously-defined group to continue in its prior action. The method 1300 may perform queue migration under which some other device in the previously-defined group may assume the role of a primary and continue management of the group and its rendering operations. The target device may become a primary for itself in a new group (initially formed only of the target device). The method 1300 may advance to box 1320 and the target device may render the identified content.

If, at box 1325, the target device is classified as a silent primary, the method 1300 may cause the silent primary to discontinue playback for the group (box 1345). The method 1300 may advance to box 1320 and the target device may render the identified content.

If, at box 1310, the target device is classified as a dumb device, the method 1300 may determine if the target device currently is playing content (box 1350). If so, the method 1300 may cause the target device to stop playback (box 1355). Thereafter, or if the target device is not playing content, the method 1300 may define another device within communication range of the target device to operate as a "silent primary" on behalf of the target device (box 1360). The silent primary device may retrieve the content identified in the command and stream the retrieved content to the target device for rendering (box 1365). The silent primary device need not play the retrieved content locally through its own output; indeed, the silent primary may play different content that is different from the content that will be played by the target device in response to the command.

During operation of the method 1300 of FIG. 13, classification of a device as "smart" or "dumb" may be based on identification of capabilities of the target device by the device's playback capabilities, its usage rights or a combination thereof. A target device may be classified as dumb when it is not capable of retrieving and playing identified content on its own. For example, the target device may not be an Internet-capable device and, therefore, would not have be capable of downloading content from Internet-based media services. Alternatively, even if the target device were capable of downloading content from such services, it may not have account information or other authentication information needed to gain access to such services. In such scenarios, the target device may be classified as dumb. Alternatively, if the target device has the capability of downloading and rendering the identified content, the target device may be classified as smart.

Queue migration operations may not be available in all devices. In such use cases, the method 1300 may discontinue playback for a group to which the target device is a member (not shown). Alternatively, the method 1300 may also start playing the identified stream on the target device, which becomes a primary for itself, and also may cause the target device to become a silent primary for other devices in its prior group (operation not shown).

Figure 14:
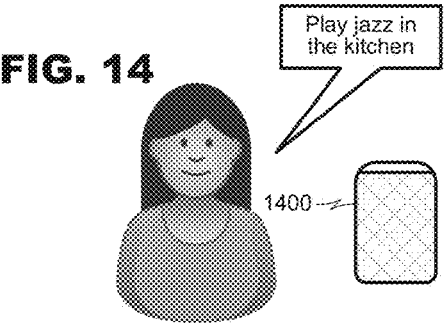
FIGS. 14 and 15 illustrate two use cases for entering commands that manage rendering devices according to aspects of the present disclosure.
Figure 15:
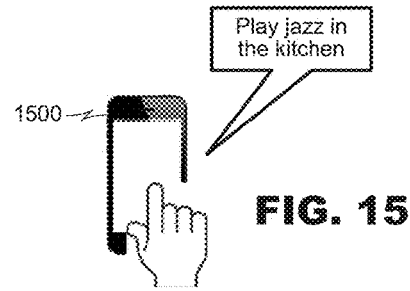

The method 1300 (FIG. 14) finds application in a variety of use cases and with a variety of devices. FIGS. 14 and 15 illustrate two such use cases. FIG. 14 illustrates a use case where an operator presents a spoken command to a playback device 1400, which may or may not be the target device itself. FIG. 15 illustrates another use case where an operator present the command to a control device 1500 (illustrated as a smartphone, in this example) via a touch screen input; in the example of FIG. 15, the control device 1500 is not the target device.

In an aspect, control methods may be provided to identify the target device and direct the command to a device that can provide control over the target device (for example, either the target device itself or a primary of the target device). One such control method is illustrated in FIG. 13. There, the method 1300 may determine if the command is received at the target device (box 1365). If so, the method 1300 may advance to box 1315 and the operations described above may be engaged. If not, then the method 1300 may determine the status of the target device (box 1370), for example, whether it is engaged in a group that has a primary. The method 1300 may relay the command to the target device or to the target device's primary (box 1375). For example, if the target device is engaged in a group, the method 1300 may relay the command to the target device's primary. If the target device may act as its own primary, the method 1300 may relay the command to the target device itself.

Figure 16:
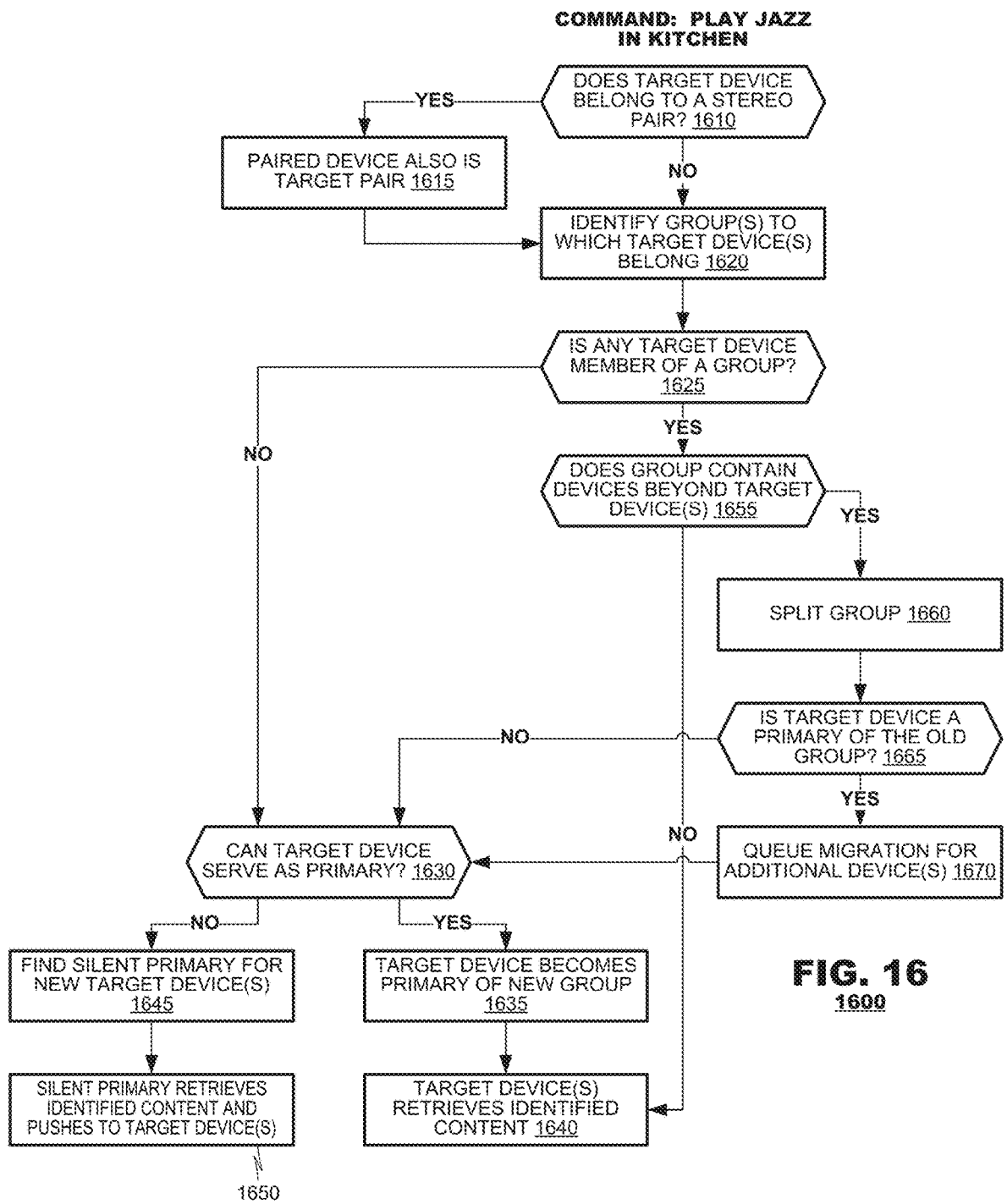
FIG. 16 illustrates a method according to another aspect of the present disclosure.

FIG. 16 illustrates a method 1600 for session 300 (FIG. 3) management according to another aspect of the present disclosure. The method 1600 may find application when a command is directed to a location that may have several target devices in it ("play jazz in the kitchen" when there are several devices in the kitchen.). The method 1600 may identify the target device to which the command is directed, and then determine whether the target device has been configured a belonging to a stereo pair (box 1610). If so, any device(s) that are paired with the target device that is addressed by the command will be evaluated under the method 1600.

The method 1600 may identify if the target device is a member of any currently-operational rendering groups (box 1620). It determines if any target device is a member of such a group (box 1625). If not, the method 1600 may determine if the target device can serve as a primary for itself (box 1630). If the target device can serve as a primary, then the method 1600 causes the target device to become primary of a new group (box 1635) and the target device retrieves the content identified by the command and begins rendering the content (box 1640). In an event where the target device is paired with another, then the devices may negotiate together to designate one of them as a primary device and the other as a secondary.

At box 1630, if the target device cannot service as a primary, the method 1600 may find another device to act as a silent primary for the target device (box 1645). When a silent primary can be assigned, the method 1600 may cause the silent primary to retrieve the identified content and push rendering data for the content to the target device(s) (box 1650). Although not illustrated in FIG. 16, it is possible that no silent primary device can be found for the identified target device(s), in which case, the method 1600 may return an error in response to the command.

At box 1625, if the target device is a member of a group, the method may determine if the group contains devices beyond the target device(s) (box 1655). If not, then the target device(s)' group may begin rendering of the identified content (box 1640).

If the target devices are members of a group that contain devices to which the command is not directed (box 1655), the method 1600 may split the target devices from the old group (box 1660). The method 1600 may determine if the target device was a primary of the prior group (box 1665). If the target device was a primary of the prior group, the method 1600 may perform queue migration for the devices that are members of the prior group from which the target device(s) were split (box 1670). If successful, a prior rendering event may continue with other devices that were members of the prior group.

Splitting the group (box 1660) will cause a new group to be formed with the target devices. The method 1600 may advance to box 1630 and perform the operations of boxes 1630-1650 to begin rendering operations for the new group.

As discussed, a device may operate as a primary for a given group based on the device's operation parameters such as having proper account information to render the identified content, operating on line power (as opposed to battery powered), quality of a network connection, and device type (e.g., a speaker device may be prioritized over other types of media players when rendering audio). When identifying a target whether a target device can serve as a primary (box 1630) each target device within a group may be evaluated based on a comparison of the device's capability to requirements for rendering content. When no target device within a group can serve as a primary, other devices that are not members of the group may be evaluated to serve as silent primaries also based on a comparison of their capabilities to requirements for rendering the identified content and also the candidate primary's ability to communicate with the target devices in the new group. In some instances, when no target device can be found to operate as a primary and when no other device can be found to operate as a silent primary, the method 1600 may end in an error content (not shown).

In some use cases, queue migration (box 1670) may not be performed successfully. In such cases, the method 1600 may cause the devices of the prior group—any devices that will not join the target devices in the new group—to cease playback (operation not shown). In another alternative, also not shown, the method 1600 may perform the operations of boxes 1630-1650 in a parallel process using the devices that formerly were part of the prior group and will not join the target device in the new group (operations also not shown).

Figure 17:
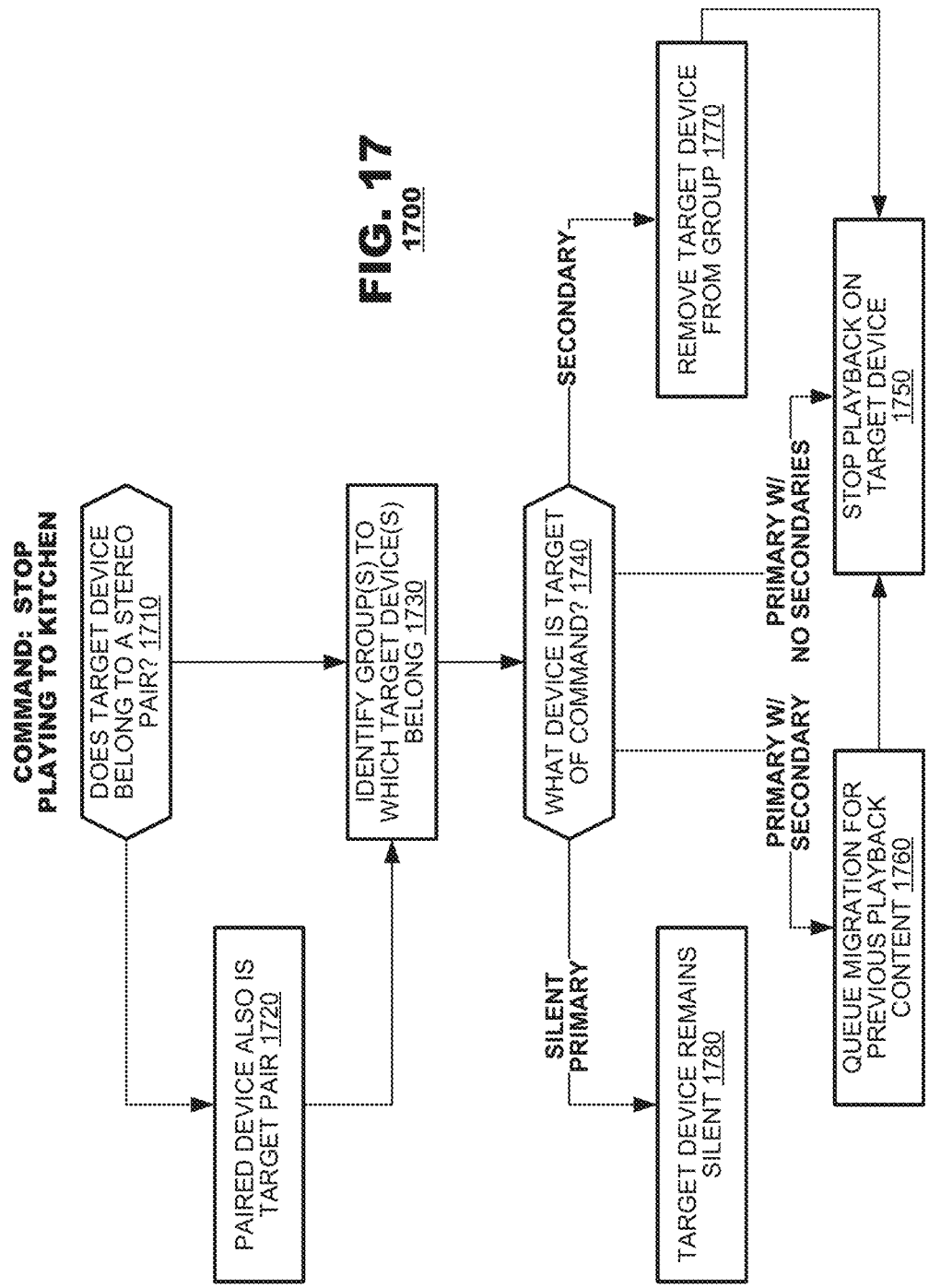
FIG. 17 illustrates a method according to a further aspect of the present disclosure.

FIG. 17 illustrates a method 1700 for session 300 (FIG. 3) management that may be performed, in an aspect of the present disclosure, in response to a command to stop playback at a target device (e.g., "stop playing to the kitchen"). As with the prior methods, the command need not be entered at the device that is the target of the device. The method 1700 may identify the device that is the target of the command and then determine whether the target device is paired with other devices (box 1710). If so, all paired devices are considered target devices for purposes of the method 1700. The method 1700 may identify a group to which the target device(s) belong (box 1730), and it may classify the target device(s) (box 1740).

If a target device is a primary without secondaries, then the method 1700 may stop playback on the target device (box 1750).

If the target device is a primary that has secondaries, the method 1700 may perform queue migration for the playback content (box 1760) to establish another device as the primary. Thereafter, the method 1700 may stop playback on the target device, as shown in box 1750. As in the prior embodiments, if queue migration fails for any reason, then optionally the method 1700 may cause playback to stop on all devices in a current group (operation not shown).

If the target device is a secondary, the method 1700 may remove the target device from its present group (box 1770) and stop play back on the target device, as shown in box 1750.

If the target device is a silent primary, the method 1700 may cause the target device to remain silent (box 1780).

Figure 18:
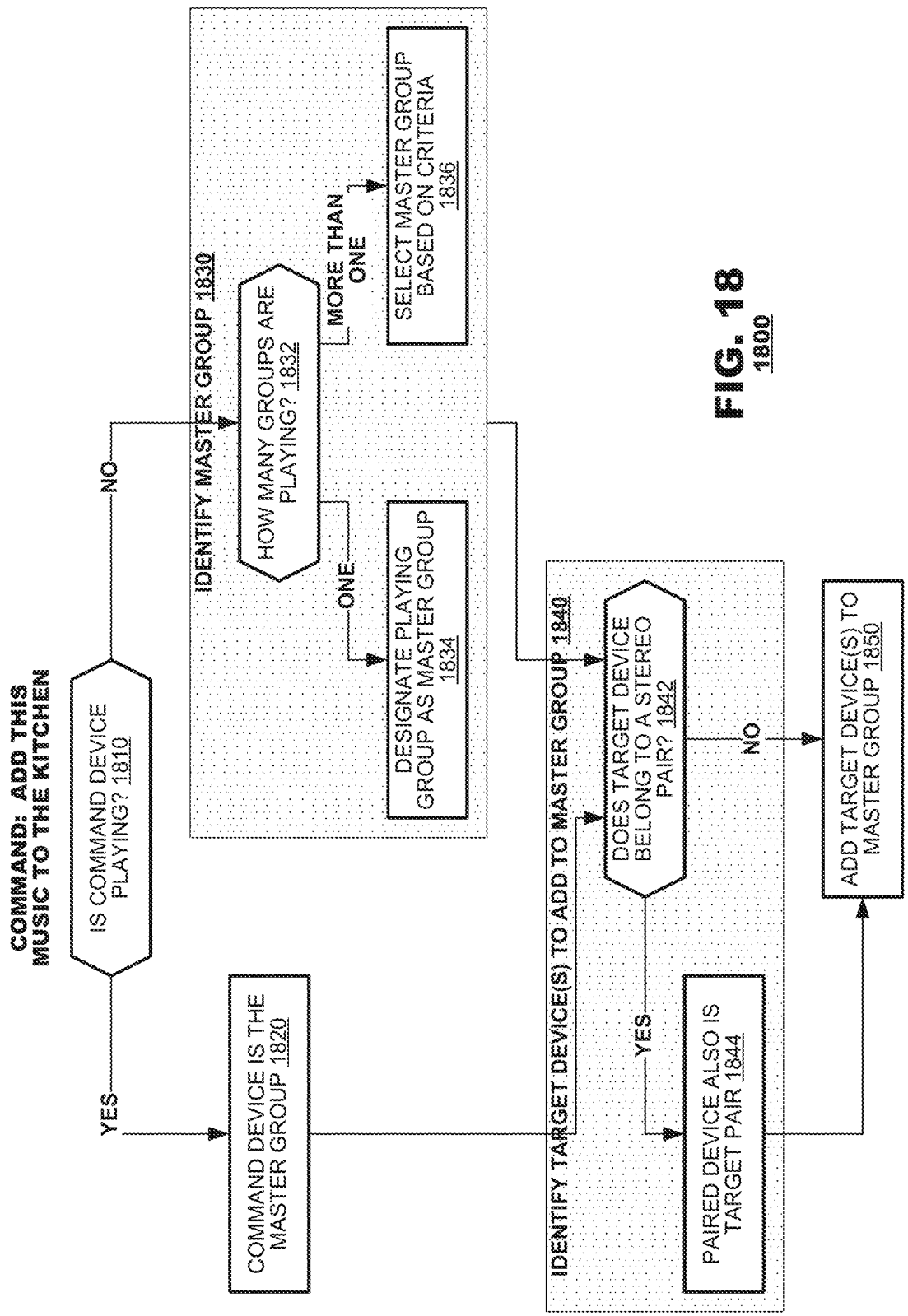
FIG. 18 illustrates a method according to another aspect of the present disclosure.

FIG. 18 illustrates another method 1800 for session 300 (FIG. 3) management according to an aspect of the present disclosure. The method 1800 may find application when a command is entered that identifies desired content in relative terms (e.g., "add this music to the kitchen," where this music is not identified directly). The method 1800 of FIG. 18 may undertake operations to identify the content that is referenced by the command.

The method 1800 may begin by determining whether the device at which the command was entered (called, the "command device," for convenience) is playing content (box 1810). If so, then the method 1800 may designate the command device as the master group for purposes of the method. The "master group" is the group to which the target device ultimately will be joined for rendering purposes.

If, at box 1810, the method 1800 determines that the command device is not playing, the method 1800 may identify the master group through alternate means (box 1830). In one aspect, the method 1800 may determine how many groups are in range that are currently engaged in playback operations (box 1832). If only one group is identified, that group may be designed at the master group (box 1834). If multiple groups are identified, then the method 1800 may designate one of the groups as the master group based on ranking criteria, such as audio proximity to the command device (and, hence, the user), Bluetooth proximity to the command device, data representing physical layout of device to the command device, and/or heuristics such as the group that started playback most recently or the group that received user interaction most recently.

Once a master group is designated, the method 1800 may identify target devices to add to the master group (box 1840). Again, the target device may be identified (the kitchen device, in this example). The method 1800 may determine of the target device is paired with any other device, such as by a stereo pairing (box 1842). If so, the paired device also is designated a target device (box 1844). Thereafter, the method 1800 may add the target device(s) to the master group (box 1850).

The principles of the present disclosure extend to other use cases. For example, a command such as "move the music to the kitchen" may be performed as remove operation that removes the target device from one playback group and an add operation that adds the target device to another playback group. Thus, the techniques disclosed in the foregoing embodiments may be performed in cascade to provide device management features of increased complexity.

Aspects of the present disclosure find use with computer-based virtual assistant services that respond to voice command inputs. In one aspect, a virtual assistant may relate user commands together in a manner the develops a command context, which permits the virtual assistant to related commands that, for example, are not specific to device or to media, to target devices or to media content.

Figure 19:
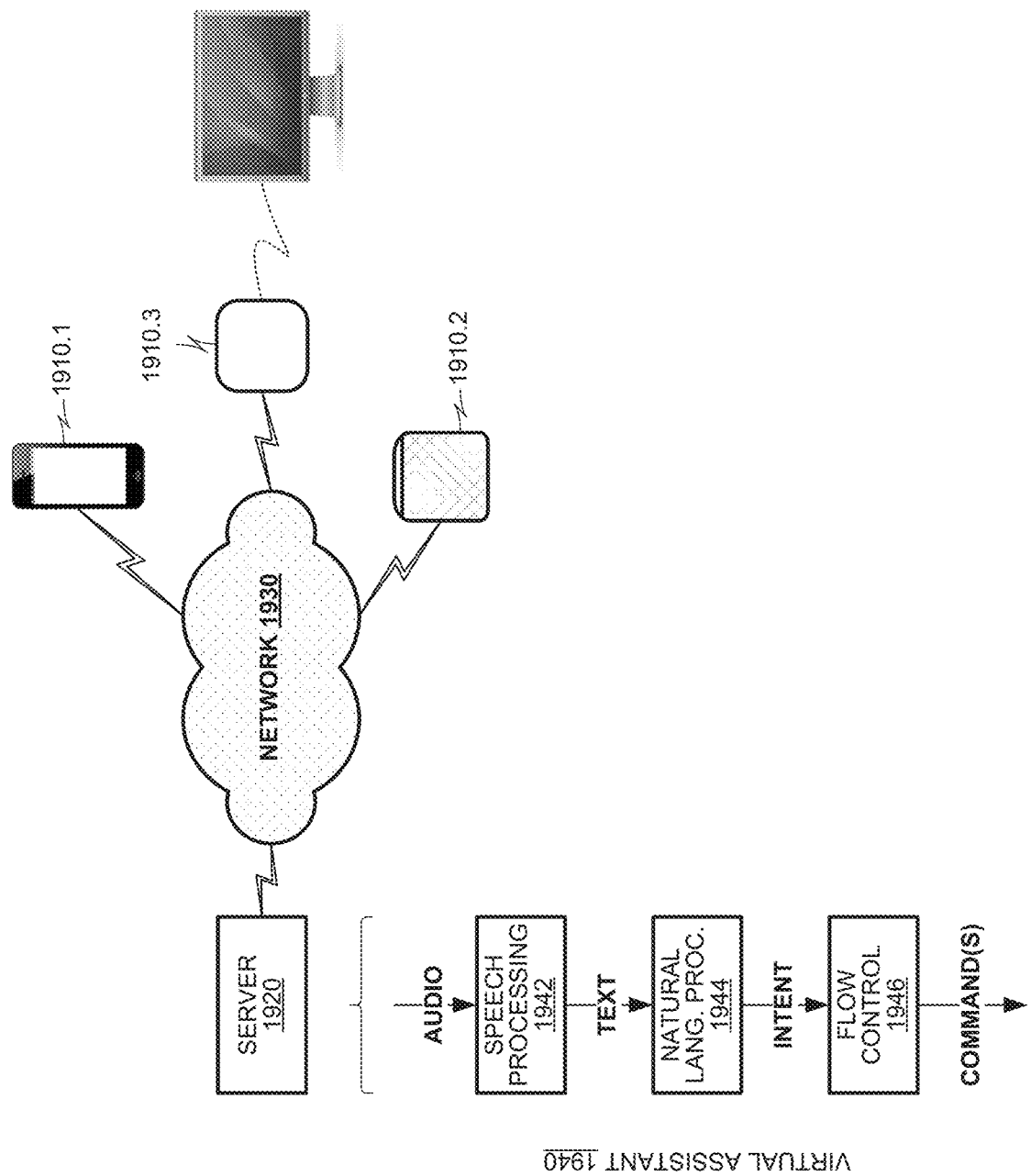
FIG. 19 is a network diagram of a system according to a further aspect of the present disclosure.

FIG. 19 is a network diagram of an exemplary system 1900 in which virtual assistant services may be used to manage sessions 300 (FIG. 3). There the system 1900 includes a plurality of user devices 1910.1-1910.3 provided in communication with a server 1920 via a communication network 1930. In this example, the virtual assistant service 1940 is shown as provided by the server 1920. In alternative implementations, the virtual assistant service 1940 may be provided by one of the user devices 1910.1-1910.3 or it may be distributed among multiple devices 1910.1-1910.3. It is expected that implementation decisions regarding placement of the virtual assistant 1940 within a system 1900 will be tailored to suit individual application needs.

The virtual assistant 1940 may include a speech process 1942, a natural language process 1944 and a flow control process 1946. The speech process 1942 may receive audio data representing spoken commands entered at one of the devices 1910.1-1910.3 and it may generate text representations of the speech. The natural language process 1944 may determine intent from the textual representations of the audio. The flow control process 1946 may generate session command(s) from the intent data generated by the natural language process 1944. These commands may be output to the devices 1910.1-1910.3 to effect session changes consistent with the spoken commands.

During operation, user commands may be entered at any device that accepts spoken input and is integrated into a system for session control. Thus, commands may be entered at smartphone devices 1910.1, smart speaker devices 1910.2, media players 1910.3 and the like. These devices may capture audio representing the spoken commands, and relay the audio to a device 1920 that operates as the virtual assistant 1940. The virtual assistant may resolve the audio into text and further into session control commands, which may be output to devices 1910.1-1910.3 to manage playback sessions.

It is expected that users will enter spoken commands that are directed to devices that are different from the devices with which the user interacts. Thus, a user may enter a command to a smartphone 1910.1 that is intended to effect changes in playback at a speaker 1910.2 or a digital media player 1910.3. At another time, a user may enter a command at a speaker 1910.2 in one room (not shown) that is intended to change playback at another speaker (not shown) in another room. Finally, it is expected that users may enter commands that do not expressly provide all information needed to effect changes in playback. For example, users may enter commands that are not specific as to the media that will be rendered or the devices that are targets of the commands.

Aspects of the present disclosure develop "contexts," data that identify device(s) and/or media that are the subject of user commands. Contexts may evolve over time in response to operator commands. When new commands are received that alter playback, a virtual assistant 1940 may refer to a presently-developed context to determine what the subject(s) of the commands.

The following example illustrates how a context may be developed. In this example, a user may enter the following commands:

Command 1: "Play jazz in the kitchen."
Command 2: "Pause."

The first command identifies a media item to be played (a jazz playlist) and a target device (a kitchen speaker). Thus, the virtual assistant 1940 may generate session commands to cause a kitchen device to render the identified media item. The virtual assistant 1940 also may store data identifying the context as including the kitchen device.

When Command 2 is received, the virtual assistant 1940 may determine that the command is not specific to media and not specific to the target device. The virtual assistant 1940 may refer to the context presently-developed for the user, and it may identify the target device from that context. In this manner, the virtual assistant 1940 may generate session commands to cause the kitchen device to pause playback.

User commands may cause expansion of a currently-developed group. Consider, for example, a command sequence as follows:

Command 1: "Play jazz in the kitchen."
Command 2: "Play this in the living room."

As discussed, the first command may develop a context group that includes kitchen playback device(s). The second command (particularly if entered at a kitchen device) may expand the context group to include target device(s) from another location. The virtual assistant 1940 may identify the context of current playback—the "this" representing a jazz playlist being rendered in a kitchen—and may add the living room device(s) to a group that is playing the jazz playlist.

Further, user commands may cause contraction of a context group. Consider a command sequence as follows:

Command 1: "Play classical everywhere."
Command 2: "Stop playing in the kitchen."

The first command may develop a context group that includes all devices in proximity to a device in which the command is entered (for example, all devices in a residence). The second command may cause a target device to be removed from the group. In this example, a virtual assistant 1940 may remove kitchen device(s) from a session but cause other devices in the group to continue playing. The virtual assistant 1940 also may cause the kitchen device(s) to be removed from the context. In this aspect, if other commands are received (say, "Play jazz"), a virtual assistant 1940 may refer to the devices then in the context (all devices except the kitchen device(s)) as targets of the later-received command.

In another aspect, a command that causes contraction of a session group may cause a context group to be cleared. Thus, in the foregoing example, when Command 2 is received, a virtual assistant may cause kitchen device(s) to be removed from a session and the context to be cleared. In this aspect, later-received commands (say, "Play jazz") may be processed without an active context available to the virtual assistant. For example, the command may be interpreted as being directed to a local device at which the command was entered. Thus, a virtual assistant 1940 would cause a jazz playlist to be rendered at a local device.

Continuing with this example, the virtual assistant also may check the playback state of that local device that will begin playing jazz. If the local device is part of a session group (e.g., the set of remaining devices that are playing classical music), the virtual assistant may cause all devices in the session group to switch to the new media item. If the local device is not part of a session group (for example, it is the kitchen device that was removed from the session group in Command 2), the virtual assistant may create a new session group using the kitchen device. In either outcome, the set of devices that are identified as the target device(s) by the virtual assistant may become a new context for use in processing of new user commands.

In a similar manner, commands that cause playback to be stopped in large regions (e.g., "Stop everywhere") may cause a context to be cleared. In such a case, a later-received command to "Play jazz" would not refer to the context "everywhere" but instead would be resolved in a different way, for example, by playing jazz on a local device at which the command was entered.

In an aspect, devices identified as members of a stereo pair (e.g., left and right speakers) may be added to and removed from contexts as a unit rather than as individual devices.

The foregoing discussion has discussed contexts as including devices that are to be identified as target devices for commands that do not expressly identify the commands' target devices. In another aspect, contexts may be developed for media items as well.

Consider the following example:
Command 1: "Play jazz in the kitchen."
Command 2: "Play that here."

For Command 2, the target device is identified by its relative position to the user—it is the device at which the user entered the spoken command. The media item, however, is not identified.

In an aspect, virtual assistants also may develop contexts identifying media (e.g., media items, media playlists) based on prior user commands. In the foregoing example, Command 1 identifies a jazz playlist as media to be rendered on a kitchen device. When processing Command 2, the context (jazz) may provide an identification of the media that the user desires to play on the new device.

Consider the following example:
Command 1: "Play jazz."
Command 2: "Play this in the kitchen."

Here, again, Command 1 identifies a media playlist to be played on a local device. Command 1 also may provide a context for later-received commands. When Command 2 is received, a virtual assistant 1940 may identify a media playlist for the command from the context (jazz). In this example, the virtual assistant 1940 would issue session commands to add kitchen devices to the group playing the jazz playlist.

Contexts may be developed for different users that interact with the virtual assistant. Thus, in a residential application, the virtual assistant may develop a context for individual members of a household. When new commands are entered from a given user, the virtual assistant may refer to the context developed for that user and identify target device(s) and/or media items to be applied to the command.

Figure 20A:
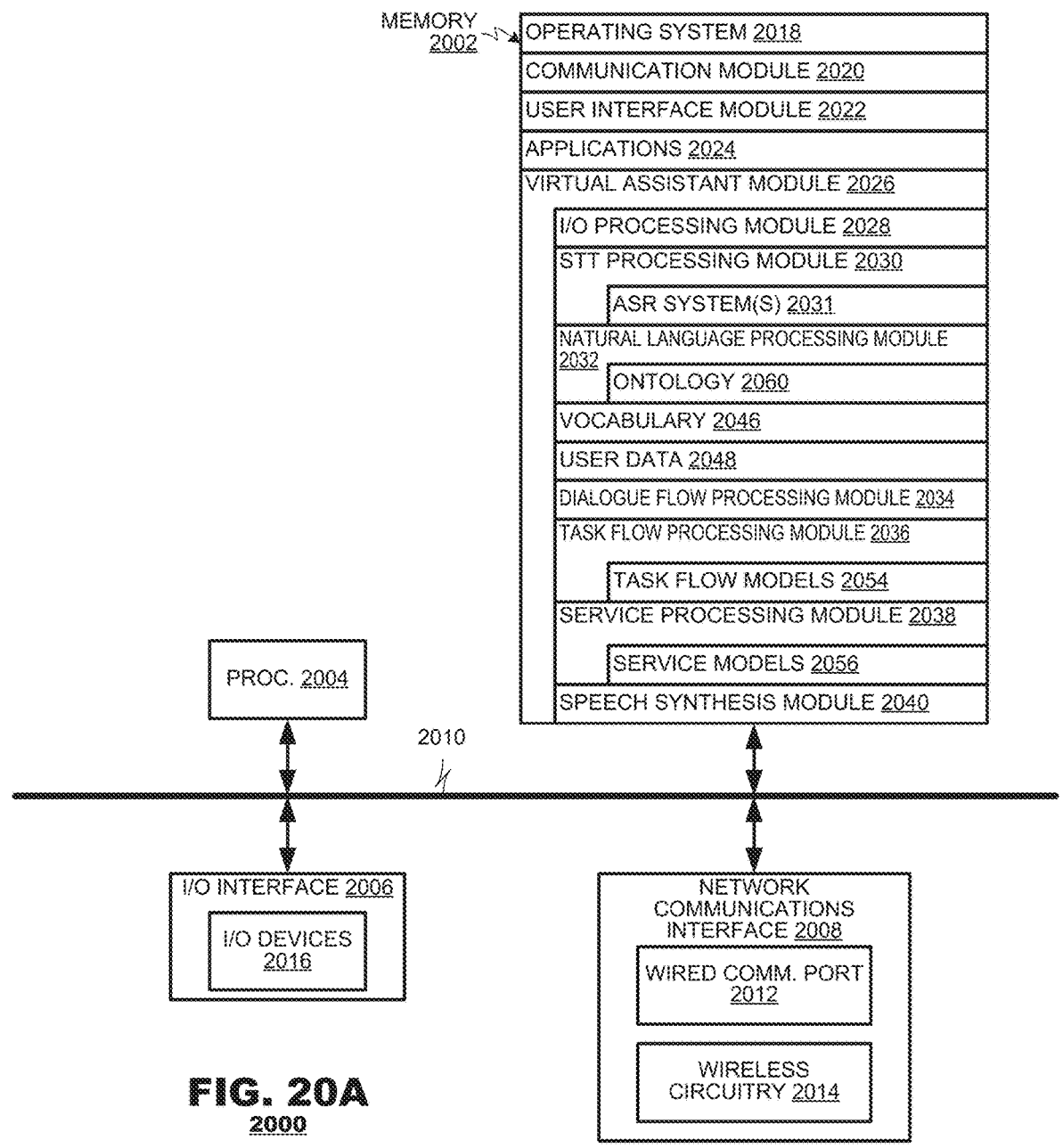
FIG. 20A is a block diagram illustrating a virtual assistant system according to an aspect of the present disclosure.

FIG. 20A illustrates a block diagram of virtual assistant system 2000 in accordance with various examples. In some examples, virtual assistant system 2000 can be implemented on a standalone computer system. In some examples, virtual assistant system 2000 can be distributed across multiple computers. In some examples, some of the modules and functions of the virtual assistant can be divided into a server portion and a client portion, where the client portion resides on one or more user devices 1910.1-1910.3 and communicates with the server portion (e.g., server 1920) through one or more networks, e.g., as shown in FIG. 19. In some examples, virtual assistant system 2000 can be an implementation of server system 1920 shown in FIG. 19. It should be noted that virtual assistant system 2000 is only one example of a virtual assistant system, and that virtual assistant system 2000 can have more or fewer components than shown, may combine two or more components, or may have a different configuration or arrangement of the components. The various components shown in FIG. 20A can be implemented in hardware, software instructions for execution by one or more processors, firmware, including one or more signal processing and/or application specific integrated circuits, or a combination thereof.

Virtual assistant system 2000 can include memory 2002, one or more processors 2004, input/output (I/O) interface 2006, and network communications interface 2008. These components can communicate with one another over one or more communication buses or signal lines 2010.

In some examples, memory 2002 can include a non-transitory computer-readable medium, such as high-speed random access memory and/or a non-volatile computer-readable storage medium (e.g., one or more magnetic disk storage devices, flash memory devices, or other non-volatile solid-state memory devices).

In some examples, I/O interface 2006 can couple input/output devices 2016 of virtual assistant system 2000, such as displays, keyboards, touch screens, and microphones, to user interface module 2022. I/O interface 2006, in conjunction with user interface module 2022, can receive user inputs (e.g., voice input, keyboard inputs, touch inputs, etc.) and processes them accordingly. In some examples, e.g., when the virtual assistant is implemented on a standalone user device, virtual assistant system 2000 can include any of the components and I/O communication interfaces that are convenient to provide communication with devices 1910.1-1910.3 (FIG. 19), respectively. In some examples, virtual assistant system 2000 can represent the server portion 1920 (FIG. 19) of a virtual assistant implementation, and can interact with the user through a client-side portion residing on a user device (e.g., devices 1910.1-1910.3 (FIG. 19)).

In some examples, the network communications interface 2008 can include wired communication port(s) 2012 and/or wireless transmission and reception circuitry 2014. The wired communication port(s) can receive and send communication signals via one or more wired interfaces, e.g., Ethernet, Universal Serial Bus (USB), FIREWIRE, etc. The wireless circuitry 2014 can receive and send RF signals and/or optical signals from/to communications networks and other communications devices. The wireless communications can use any of a plurality of communications standards, protocols, and technologies, such as GSM, EDGE, CDMA, TDMA, Bluetooth, Wi-Fi, VoIP, Wi-MAX, or any other suitable communication protocol. Network communications interface 2008 can enable communication between virtual assistant system 2000 with networks, such as the Internet, an intranet, and/or a wireless network, such as a cellular telephone network, a wireless local area network (LAN), and/or a metropolitan area network (MAN), and other devices.

In some examples, memory 2002, or the computer-readable storage media of memory 2002, can store programs, modules, instructions, and data structures including all or a subset of: operating system 2018, communications module 2020, user interface module 2022, one or more applications 2024, and virtual assistant module 2026. In particular, memory 2002, or the computer-readable storage media of memory 2002, can store instructions for performing a process. One or more processors 2004 can execute these programs, modules, and instructions, and reads/writes from/to the data structures.

Operating system 2018 (e.g., Darwin, RTXC, LINUX, UNIX, iOS, OS X, WINDOWS, or an embedded operating system such as VxWorks) can include various software components and/or drivers for controlling and managing general system tasks (e.g., memory management, storage device control, power management, etc.) and facilitates communications between various hardware, firmware, and software components.

Communications module 2020 can facilitate communications between virtual assistant system 2000 with other devices over network communications interface 2008. For example, communications module 2020 can communicate with RF circuitry 208 of electronic devices such as devices 1910.1-1910.3 (FIG. 19), respectively. Communications module 2020 can also include various components for handling data received by wireless circuitry 2014 and/or wired communications port 2012.

User interface module 2022 can receive commands and/or inputs from a user via I/O interface 2006 (e.g., from a keyboard, touch screen, pointing device, controller, and/or microphone), and generate user interface objects on a display. User interface module 2022 can also prepare and deliver outputs (e.g., speech, sound, animation, text, icons, vibrations, haptic feedback, light, etc.) to the user via the I/O interface 2006 (e.g., through displays, audio channels, speakers, touch-pads, etc.).

Applications 2024 can include programs and/or modules that are configured to be executed by one or more processors 2004. For example, if the virtual assistant system is implemented on a standalone user device, applications 2024 can include user applications, such as games, a calendar application, a navigation application, or an email application. If virtual assistant system 2000 is implemented on a server 1920 (FIG. 19), applications 2024 can include resource management applications, diagnostic applications, or scheduling applications, for example.

Memory 2002 can also store virtual assistant module 2026 (or the server portion of a virtual assistant). In some examples, virtual assistant module 2026 can include the following sub-modules, or a subset or superset thereof: input/output processing module 2028, speech-to-text (STT) processing module 2030, natural language processing module 2032, dialogue flow processing module 2034, task flow processing module 2036, service processing module 2038, and speech synthesis module 2040. Each of these modules can have access to one or more of the following systems or data and models of the virtual assistant module 2026, or a subset or superset thereof: ontology 2060, vocabulary index 2044, user data 2048, task flow models 2054, service models 2056, and ASR systems.

In some examples, using the processing modules, data, and models implemented in virtual assistant module 2026, the virtual assistant can perform at least some of the following: converting speech input into text; identifying a user's intent expressed in a natural language input received from the user; actively eliciting and obtaining information needed to fully infer the user's intent (e.g., by disambiguating words, games, intentions, etc.); determining the task flow for fulfilling the inferred intent; and executing the task flow to fulfill the inferred intent.

Figure 20B:
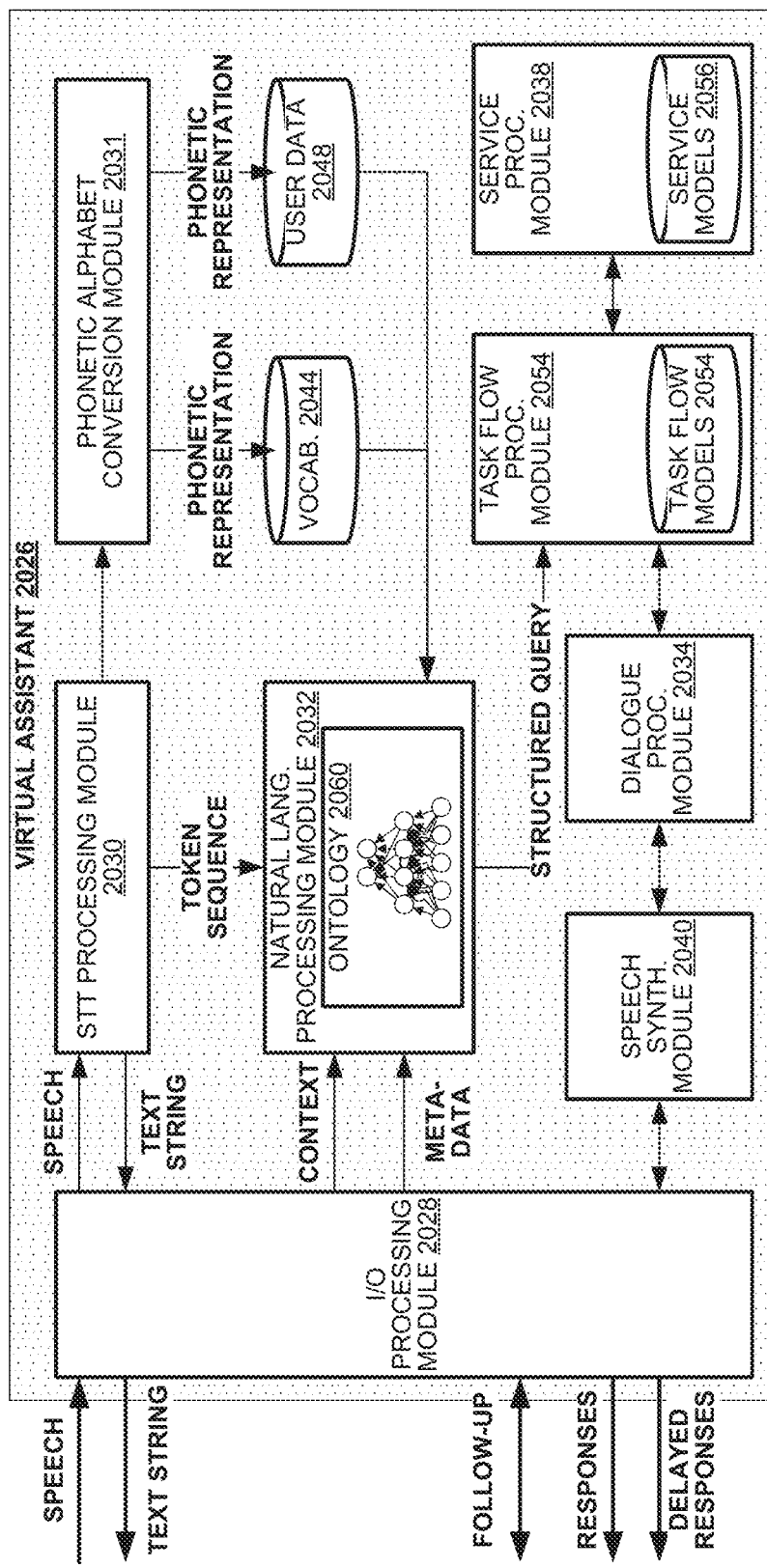
FIG. 20B illustrates functions of a virtual assistant system according to an aspect of the present disclosure.

In some examples, as shown in FIG. 20B, I/O processing module 2028 can interact with the user through I/O devices 2016 in FIG. 20A or with a user device (e.g., devices 1910.1-1910.3 (FIG. 19)) through network communications interface 2008 in FIG. 20A to obtain user input (e.g., a speech input) and to provide responses (e.g., as speech outputs) to the user input. I/O processing module 2028 can optionally obtain contextual information associated with the user input from the user device, along with or shortly after the receipt of the user input. The contextual information can include user-specific data, vocabulary, and/or preferences relevant to the user input. In some examples, the contextual information also includes software and hardware states of the user device at the time the user request is received, and/or information related to the surrounding environment of the user at the time that the user request was received. In some examples, I/O processing module 2028 can also send follow-up questions to, and receive answers from, the user regarding the user request. When a user request is received by I/O processing module 2028 and the user request can include speech input, I/O processing module 2028 can forward the speech input to STT processing module 2030 (or speech recognizer) for speech-to-text conversions.

STT processing module 2030 can include one or more ASR systems. The one or more ASR systems can process the speech input that is received through I/O processing module 2028 to produce a recognition result. Each ASR system can include a front-end speech pre-processor. The front-end speech pre-processor can extract representative features from the speech input. For example, the front-end speech pre-processor can perform a Fourier transform on the speech input to extract spectral features that characterize the speech input as a sequence of representative multi-dimensional vectors. Further, each ASR system can include one or more speech recognition models (e.g., acoustic models and/or language models) and can implement one or more speech recognition engines. Examples of speech recognition models can include Hidden Markov Models, Gaussian-Mixture Models, Deep Neural Network Models, n-gram language models, and other statistical models. Examples of speech recognition engines can include the dynamic time warping based engines and weighted finite-state transducers (WFST) based engines. The one or more speech recognition models and the one or more speech recognition engines can be used to process the extracted representative features of the front-end speech pre-processor to produce intermediate recognitions results (e.g., phonemes, phonemic strings, and sub-words), and ultimately, text recognition results (e.g., words, word strings, or sequence of tokens). In some examples, the speech input can be processed at least partially by a third-party service or on the user's device (e.g., device 1910.1-1910.3 (FIG. 19)) to produce the recognition result. Once STT processing module 2030 produces recognition results containing a text string (e.g., words, or sequence of words, or sequence of tokens), the recognition result can be passed to natural language processing module 2032 for intent deduction.

In some examples, STT processing module 2030 can include and/or access a vocabulary of recognizable words via phonetic alphabet conversion module 2031. Each vocabulary word can be associated with one or more candidate pronunciations of the word represented in a speech recognition phonetic alphabet. In particular, the vocabulary of recognizable words can include a word that is associated with a plurality of candidate pronunciations. For example, the vocabulary may include the word "tomato" that is associated with the candidate pronunciations of /tə'meɪroʊ/ and /tə'mɑtoʊ/. Further, vocabulary words can be associated with custom candidate pronunciations that are based on previous speech inputs from the user. Such custom candidate pronunciations can be stored in STT processing module 2030 and can be associated with a particular user via the user's profile on the device. In some examples, the candidate pronunciations for words can be determined based on the spelling of the word and one or more linguistic and/or phonetic rules. In some examples, the candidate pronunciations can be manually generated, e.g., based on known canonical pronunciations.

In some examples, the candidate pronunciations can be ranked based on the commonness of the candidate pronunciation. For example, the candidate pronunciation /tə'meɪroʊ/ can be ranked higher than /tə'mɑtoʊ/, because the former is a more commonly used pronunciation (e.g., among all users, for users in a particular geographical region, or for any other appropriate subset of users). In some examples, candidate pronunciations can be ranked based on whether the candidate pronunciation is a custom candidate pronunciation associated with the user. For example, custom candidate pronunciations can be ranked higher than canonical candidate pronunciations. This can be useful for recognizing proper nouns having a unique pronunciation that deviates from canonical pronunciation. In some examples, candidate pronunciations can be associated with one or more speech characteristics, such as geographic origin, nationality, or ethnicity. For example, the candidate pronunciation /tə'meɪroʊ/ can be associated with the United States, whereas the candidate pronunciation /tə'mɑtoʊ/ can be associated with Great Britain. Further, the rank of the candidate pronunciation can be based on one or more characteristics (e.g., geographic origin, nationality, ethnicity, etc.) of the user stored in the user's profile on the device. For example, it can be determined from the user's profile that the user is associated with the United States. Based on the user being associated with the United States, the candidate pronunciation /tə'meɪroʊ/ (associated with the United States) can be ranked higher than the candidate pronunciation /tə'mɑtoʊ/ (associated with Great Britain). In some examples, one of the ranked candidate pronunciations can be selected as a predicted pronunciation (e.g., the most likely pronunciation).

When a speech input is received, STT processing module 2030 can be used to determine the phonemes corresponding to the speech input (e.g., using an acoustic model), and then attempt to determine words that match the phonemes (e.g., using a language model). For example, if STT processing module 2030 can first identify the sequence of phonemes / təˈmeɪroʊ / corresponding to a portion of the speech input, it can then determine, based on vocabulary index 2044, that this sequence corresponds to the word "tomato."

In some examples, STT processing module 2030 can use approximate matching techniques to determine words in an utterance. Thus, for example, the STT processing module 2030 can determine that the sequence of phonemes / təˈmeɪroʊ / corresponds to the word "tomato," even if that particular sequence of phonemes is not one of the candidate sequence of phonemes for that word.

In some examples, natural language processing module 2032 can be configured to receive metadata associated with the speech input. The metadata can indicate whether to perform natural language processing on the speech input (or the sequence of words or tokens corresponding to the speech input). If the metadata indicates that natural language processing is to be performed, then the natural language processing module can receive the sequence of words or tokens from the STT processing module to perform natural language processing. However, if the metadata indicates that natural language process is not to be performed, then the natural language processing module can be disabled and the sequence of words or tokens (e.g., text string) from the STT processing module can be outputted from the virtual assistant. In some examples, the metadata can further identify one or more domains corresponding to the user request. Based on the one or more domains, the natural language processor can disable domains in ontology 2060 other than the one or more domains. In this way, natural language processing is constrained to the one or more domains in ontology 2060. In particular, the structure query (described below) can be generated using the one or more domains and not the other domains in the ontology.

Natural language processing module 2032 ("natural language processor") of the virtual assistant can take the sequence of words or tokens ("token sequence") generated by STT processing module 2030, and attempt to associate the token sequence with one or more "actionable intents" recognized by the virtual assistant. An "actionable intent" can represent a task that can be performed by the virtual assistant, and can have an associated task flow implemented in task flow models 2054. The associated task flow can be a series of programmed actions and steps that the virtual assistant takes in order to perform the task. The scope of a virtual assistant's capabilities can be dependent on the number and variety of task flows that have been implemented and stored in task flow models 2054, or in other words, on the number and variety of "actionable intents" that the virtual assistant recognizes. The effectiveness of the virtual assistant, however, can also be dependent on the assistant's ability to infer the correct "actionable intent(s)" from the user request expressed in natural language.

In some examples, in addition to the sequence of words or tokens obtained from STT processing module 2030, natural language processing module 2032 can also receive contextual information associated with the user request, e.g., from I/O processing module 2028. The natural language processing module 2032 can optionally use the contextual information to clarify, supplement, and/or further define the information contained in the token sequence received from STT processing module 2030. The contextual information can include, for example, user preferences, hardware, and/or software states of the user device, sensor information collected before, during, or shortly after the user request, prior interactions (e.g., dialogue) between the virtual assistant and the user, and the like. As described herein, contextual information can be dynamic, and can change with time, location, content of the dialogue, and other factors.

In some examples, the natural language processing can be based on, e.g., ontology 2060. Ontology 2060 can be a hierarchical structure containing many nodes, each node representing either an "actionable intent" or a "property" relevant to one or more of the "actionable intents" or other "properties." As noted above, an "actionable intent" can represent a task that the virtual assistant is capable of performing, i.e., it is "actionable" or can be acted on. A "property" can represent a parameter associated with an actionable intent or a sub-aspect of another property. A linkage between an actionable intent node and a property node in ontology 2060 can define how a parameter represented by the property node pertains to the task represented by the actionable intent node.

In some examples, ontology 2060 can be made up of actionable intent nodes and property nodes. Within ontology 2060, each actionable intent node can be linked to one or more property nodes either directly or through one or more intermediate property nodes. Similarly, each property node can be linked to one or more actionable intent nodes either directly or indirectly through one or more intermediate property nodes.

An actionable intent node, along with its linked concept nodes, can be described as a "domain." In the present discussion, each domain can be associated with a respective actionable intent, and refers to the group of nodes (and the relationships there between) associated with the particular actionable intent. Each domain can share one or more property nodes with one or more other domains.

In some examples, an ontology 2060 can include all the domains (and hence actionable intents) that the virtual assistant is capable of understanding and acting upon. In some examples, ontology 2060 can be modified, such as by adding or removing entire domains or nodes, or by modifying relationships between the nodes within the ontology 2060.

Moreover, in some examples, nodes associated with multiple related actionable intents can be clustered under a "super domain" in ontology 2060.

In some examples, each node in ontology 2060 can be associated with a set of words and/or phrases that are relevant to the property or actionable intent represented by the node. The respective set of words and/or phrases associated with each node can be the so-called "vocabulary" associated with the node. The respective set of words and/or phrases associated with each node can be stored in vocabulary index 2044 in association with the property or actionable intent represented by the node. The vocabulary index 2044 can optionally include words and phrases in different languages.

Natural language processing module 2032 can receive the token sequence (e.g., a text string) from STT processing module 2030, and determine what nodes are implicated by the words in the token sequence. In some examples, if a word or phrase in the token sequence is found to be associated with one or more nodes in ontology 2060 (via vocabulary index 2044), the word or phrase can "trigger" or "activate" those nodes. Based on the quantity and/or relative importance of the activated nodes, natural language processing module 2032 can select one of the actionable intents as the task that the user intended the virtual assistant to perform. In some examples, the domain that has the most "triggered" nodes can be selected. In some examples, the domain having the highest confidence value (e.g., based on the relative importance of its various triggered nodes) can be selected. In some examples, the domain can be selected based on a combination of the number and the importance of the triggered nodes. In some examples, additional factors are considered in selecting the node as well, such as whether the virtual assistant has previously correctly interpreted a similar request from a user.

User data 2048 can include user-specific information, such as user-specific vocabulary, user preferences, user address, user's default and secondary languages, user's contact list, and other short-term or long-term information for each user. In some examples, natural language processing module 2032 can use the user-specific information to supplement the information contained in the user input to further define the user intent.

In some examples, once natural language processing module 2032 identifies an actionable intent (or domain) based on the user request, natural language processing module 2032 can generate a structured query to represent the identified actionable intent. In some examples, the structured query can include parameters for one or more nodes within the domain for the actionable intent, and at least some of the parameters are populated with the specific information and requirements specified in the user request. According to an ontology, a structured query for a domain may include predetermined parameters. In some examples, based on the speech input and the text derived from the speech input using STT processing module 2030, natural language processing module 2032 can generate a partial structured query for a domain, where the partial structured query includes the parameters associated with the domain. In some examples, natural language processing module 2032 can populate some parameters of the structured query with received contextual information, as discussed.

In some examples, natural language processing module 2032 can pass the generated structured query (including any completed parameters) to task flow processing module 2036 ("task flow processor"). Task flow processing module 2036 can be configured to receive the structured query from natural language processing module 2032, complete the structured query, if necessary, and perform the actions required to "complete" the user's ultimate request. In some examples, the various procedures necessary to complete these tasks can be provided in task flow models 2054. In some examples, task flow models 2054 can include procedures for obtaining additional information from the user and task flows for performing actions associated with the actionable intent.

In some use cases, in order to complete a structured query, task flow processing module 2036 may need to initiate additional dialogue with the user in order to obtain additional information, and/or disambiguate potentially ambiguous utterances. When such interactions are necessary, task flow processing module 2036 can invoke dialogue flow processing module 2034 to engage in a dialogue with the user. In some examples, dialogue flow processing module 2034 can determine how (and/or when) to ask the user for the additional information and receives and processes the user responses. The questions can be provided to and answers can be received from the users through I/O processing module 2028. In some examples, dialogue flow processing module 2034 can present dialogue output to the user via audio and/or visual output, and receives input from the user via spoken or physical (e.g., clicking) responses. Continuing with the example above, when task flow processing module 2036 invokes dialogue flow processing module 2034 to determine the parameter information for the structured query associated with a selected domain, dialogue flow processing module 2034 can generate questions to pass to the user. Once answers are received from the user, dialogue flow processing module 2034 can then populate the structured query with the missing information, or pass the information to task flow processing module 2036 to complete the missing information from the structured query.

Once task flow processing module 2036 has completed the structured query for an actionable intent, task flow processing module 2036 can proceed to perform the ultimate task associated with the actionable intent. Accordingly, task flow processing module 2036 can execute the steps and instructions in the task flow model according to the specific parameters contained in the structured query.

In some examples, task flow processing module 2036 can employ the assistance of service processing module 2038 ("service processing module") to complete a task requested in the user input or to provide an informational answer requested in the user input. In some examples, the protocols and application programming interfaces (API) required by each service can be specified by a respective service model among service models 2056. Service processing module 2038 can access the appropriate service model for a service and generate requests for the service in accordance with the protocols and APIs required by the service according to the service model.

In some examples, natural language processing module 2032, dialogue flow processing module 2034, and task flow processing module 2036 can be used collectively and iteratively to infer and define the user's intent, obtain information to further clarify and refine the user intent, and finally generate a response (i.e., an output to the user, or the completion of a task) to fulfill the user's intent. The generated response can be a dialogue response to the speech input that at least partially fulfills the user's intent. Further, in some examples, the generated response can be output as a speech output. In these examples, the generated response can be sent to speech synthesis module 2040 (e.g., speech synthesizer) where it can be processed to synthesize the dialogue response in speech form. In yet other examples, the generated response can be data content relevant to satisfying a user request in the speech input.

Speech synthesis module 2040 can be configured to synthesize speech outputs for presentation to the user. Speech synthesis module 2040 synthesizes speech outputs based on text provided by the virtual assistant. For example, the generated dialogue response can be in the form of a text string. Speech synthesis module 2040 can convert the text string to an audible speech output. Speech synthesis module 2040 can use any appropriate speech synthesis technique in order to generate speech outputs from text, including, but not limited, to concatenative synthesis, unit selection synthesis, diphone synthesis, domain-specific synthesis, formant synthesis, articulatory synthesis, hidden Markov model (HMM) based synthesis, and sinewave synthesis. In some examples, speech synthesis module 2040 can be configured to synthesize individual words based on phonemic strings corresponding to the words. For example, a phonemic string can be associated with a word in the generated dialogue response. The phonemic string can be stored in metadata associated with the word. Speech synthesis model 2040 can be configured to directly process the phonemic string in the metadata to synthesize the word in speech form.

In some examples, instead of (or in addition to) using speech synthesis module 2040, speech synthesis can be performed on a remote device (e.g., the server system 1920 (FIG. 19)), and the synthesized speech can be sent to the user device for output to the user. For example, this can occur in some implementations where outputs for a virtual assistant are generated at a server system. And because server systems generally have more processing power or resources than a user device, it can be possible to obtain higher quality speech outputs than would be practical with client-side synthesis.

While the invention has been described in detail above with reference to some embodiments, variations within the scope and spirit of the invention will be apparent to those of ordinary skill in the art. Thus, the invention should be considered as limited only by the scope of the appended claims.

FIG. 21 illustrates a system 2100 according to another aspect of the present disclosure. In this embodiment, rendering devices 2110.1-2110.*n* are provided in communication with a server 2120 via a communication network 2130. In one implementation, the server 2120 may be provided in a local area network in which the rendering devices 2110.1-2110.*n* are located, as may occur when a server 2120 acts as a proxy device for a residential network. In another implementation, the server 2120 may be provided at an Internet location, as may occur when the server 2120 is integrated into an online service.

In the aspect illustrated in FIG. 21, the server 2120 may perform session management operations described hereinabove. Thus, the server 2120 may store playback queue data and manage session data of the rendering devices 2110.1-2110.*n*. Although the server 2120 would not render media data as part of playback, the server 2120 may operate as a master on behalf of the rendering devices 2110.1-2110.*n* that are engaged in playback. In this aspect, the server 2120 may act as the master device on behalf of many simultaneously-active groups. The server 2120 may store data of rendering devices 2110.1-2110.*n* that are registered with it in a registry 2125.

FIG. 22 illustrates a communication flow 2200 for session 300 (FIG. 3) management that may occur between a rendering device 2210 and a server 2220 according to an aspect of the present disclosure to register a rendering device 2210 with the server 2200. The rendering device 2210 may send a registration message (msg. 2230) to the server 2200 identifying the device. The server 2220 may determine whether the device is a new device, one for which the server 2220 does not yet store information (box 2232). If so, the server 2220 may send a request message (msg. 2234) to the rendering device 2210 requesting information such as its capabilities, location, and account information. The rendering device 2210 may provide requested information in a response message (msg. 2236), and the server 2220 may store the rendering device in its registry (box 2238). If at box 2232, the server 2220 determined that the rendering device 2210 is not a new device, the server 2220 may mark the rendering device 2210 as active in its registry (also box 2238).

The principles of the present disclosure find application in ad hoc networking environments where individual rendering devices may be powered on and off at indeterminate times, and may gain and lose network connectivity also at indeterminate times. Accordingly, the method 2200 of FIG. 22 may be initiated by rendering devices as part of standard power up procedures or when they gain network connectivity.

FIG. 23 illustrates a session 300 management method 2300 according to an aspect of the present disclosures. The method 2300 may initiate when a user command is received (box 2310) at an input device (ex.: "play jazz in the kitchen"). Upon receipt of the command, an input device may report the command to a server 2120 (FIG. 21) (box 2315). At the server, the method 2300 may identify target device(s) of the command from its registry data (box 2320). For each target device so identified, the method 2300 may engage appropriate steps from the operations illustrated in boxes 2325-2385.

The method may determine a type of target device (box 2325). If the method 2300 classifies the target device as a smart device, the method 2300 may determine if the target device already is a member of an active group (box 2330). If not, the method 2300 may cause the server to issue a command to the target device to begin playback, identifying a playlist to the target device and its role in a group (box 2335).

If, at box 2330, the method 2300 determines that the target device already is a member of a group, the method 2300 may determine the target device's role within its group (box 2340). If the target device is a primary, the method 2300 may determine to split the group (box 2345). The method 2300 may initiate a queue migration process for playback content of the already-active group (box 2350), which may cause the server to issue command(s) (not shown) to other members of the already-active group, designating one of those members as a new primary device. The method 2300 may cause the server to issue a command to the target device to begin playback, identifying a playlist to the target device and its role in a group (box 2335).

If, at box 2340, the method determines that the target device is acting as a silent primary, the method 2300 may issue a command to the target device to discontinue playback on behalf of its already-active group (box 2355). The method 2300 may issue a command to another target device of the already-active group, designating it as a new silent primary (box 2360). The method 2300 also may cause the server to issue a command to the target device to begin playback, identifying a playlist to the target device and its role in a group (box 2335). In an aspect, the commands issued to the target device in boxes 2355 and 2335 may be merged into a common message or set of messages.

If at box 2340, the method determines that the target device is acting as a secondary, the method 2300 may issue a command to the target device that assigns the target device to a new group (box 2365). The method 2300 also may cause the server to issue a command to the target device to begin playback, identifying a playlist to the target device and its role in a group (box 2335). Again, the commands issued to the target device in boxes 2365 and 2335 may be merged into a common message or set of messages.

If, at box 2325, the method determines that the target device is a dumb device, the method 2300 may determine if the target device currently is engaged in playback (box 2370). If so, the method 2300 may issue a command to the target device to stop playback (box 2375). The method 2300 may define a silent primary for the target device 2380 (box 2380) and issue a command to the target device identifying its new primary (box 2385). The commands issued to the target device in boxes 2375 and 2385 may be merged into a common message or set of messages. The method 2300 may issue a command to the designated primary device 2385 to stream media to the target device (box 2385).

As explained above, the present disclosure presents techniques for developing ad hoc rendering networks among a plurality of loosely-connected rendering devices of various designs and capabilities. The devices may discover each other autonomously and they may exchange communications to synchronize their rendering operations. The devices may have a wide variety of capabilities. Some highly-capable devices may possess capabilities to communicate with media sources, authenticate themselves as having access rights to media items that are to be rendered as part of a playback session, and download the media items autonomously for playback. Other minimally-capable device may not possess such functionality; they may operate in a "secondary" mode in a primary-secondary relationship where they receive media content transmitted to it from another "primary" device without having the capability, for example, to authenticate themselves to media sources or download media items autonomously. Moreover, the rendering devices may accept user input through any of a number of different devices—touch screen input via smartphones or computers, audio input captured by microphones at smartphones, computers or smart speakers, etc. —to control rendering operations performed by the rendering network. It is expected that the various session management techniques disclosed herein may be applied adaptively in response to changing circumstances warrant among a rendering session. For example, it may occur that a given session 300, when initiated, will be managed by a first rendering device (FIG. 1 that operates as a primary but, over time owing perhaps to the removal of the first rendering device from the session, the session thereafter will be managed by a server at the Internet (FIG. 21). It may occur that the session will be managed by a communication flow 400 (FIG. 4) at one point during operation, it may be managed by the method 1300 (FIG. 13) at another point during its lifecycle and it may be managed by the method 2300 (FIG. 23) at yet another point during its lifecycle. The principles of the present disclosure accommodate such variations.

The foregoing discussion identifies functional blocks that may be used in playback device(s) and servers constructed according to various embodiments of the present invention. In some applications, the functional blocks described hereinabove may be provided as elements of an integrated software system, in which the blocks may be provided as separate elements of a computer program that are stored in memory and executed by a processing device. A non-transient computer readable medium may have program instructions for causing a computer to perform the functional blocks. In other applications, the functional blocks may be provided as discrete circuit components of a processing system, such as functional units within a digital signal processor or application-specific integrated circuit. Still other applications of the present invention may be embodied as a hybrid system of dedicated hardware and software components. Moreover, the functional blocks described herein need not be provided as separate units. Such implementation details are immaterial to the operation of the present invention unless otherwise noted above.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

Several embodiments of the invention are specifically illustrated and/or described herein. However, it will be appreciated that modifications and variations of the invention are covered by the above teachings and within the purview of the appended claims without departing from the spirit and intended scope of the invention.

We claim:

1. A method of multi-room control, comprising:
    in response to a command to play a media asset in an identified room for a playback session of networked rendering devices:
        identifying a current playback room based on a context of prior commands in the playback session, and
        determining whether the current playback room and the identified room are different;
        when the current playback room and the identified room are different;
            identifying a target device associated with the identified room, and
            identifying, from rendering capabilities of the identified target device, which asset component of a plurality of asset components in the media asset to be rendered by the target device, wherein the asset component is a first representation of a media asset of the playback session; and
    synchronizing playback of the media asset on the target device with playback on other device(s) that are members of the playback session, the synchronizing including identifying respective other asset component(s) to be rendered pursuant to the playback session by the other device(s), the other asset component(s) representing other representation(s) of the media asset, and timing of playback of the asset component to timing of the other asset component(s).

2. The method of claim 1, further comprising:
    identifying additional target device(s) associated with the identified room;
    adding the target device and the additional target device(s) to the playback session; and
    removing devices from the playback session that are not associated with the identified room;
    wherein the synchronizing playback includes synchronizing the target device with the additional target device(s).

3. The method of claim 2, wherein a playback queue for the playback session is stored on a first master device of the networked rendering devices, and the removing of devices removes the first master device, and further comprising:
    migrating the playback queue from the first master device to a second master device associated with the identified room.

4. The method of claim 2, further comprising:
    clearing the context of prior commands after the removing of the devices that are not associated with the identified room.

5. The method of claim 1, wherein the target device is a portable device, and the portable device is associated with the identified room when a protocol discovers the target devices is nearby other devices previously associated with the identified room.

6. The method of claim 1, further comprising:
    when the target device is determined to be a dumb device;
        identifying a silent primary device for the target device,
        retrieve, by the silent primary device, the asset component of the media asset for identified for the target device, and
        send the retrieved asset component from the silent primary device to the target device.

7. The method of claim 1, further comprising:
    when the target device is a member of a stereo pair, the synchronizing playback includes both the target device and the other member of the stereo pair.

8. A non-transitory computer readable medium storing program instructions that, when executed by a processing device, cause the device to perform:
    in response to a command to play a media asset in an identified room for a playback session of networked rendering devices:
        identifying a current playback room based on a context of prior commands in the playback session, and
        determining whether the current playback room and the identified room are different;
        when the current playback room and the identified room are different;
            identifying a target device associated with the identified room, and
            identifying, from capabilities of the identified target device, which asset component of a plurality of asset components in the media asset to be rendered by the target device, wherein the asset component is a first representation of a media asset of the playback session; and
    synchronizing playback of the media asset on the target device with playback on other device(s) that are members of the playback session, the synchronizing including identifying respective other asset component(s) to be rendered pursuant to the playback session by the other device(s), the other asset component(s) representing other representation(s) of the media asset, and timing of playback of the asset component to timing of the other asset component(s).

9. The non-transitory computer readable medium of claim 8, wherein the instructions further cause the device to perform:
    identifying additional target device(s) associated with the identified room;
    adding the target device and the additional target device(s) to the playback session; and removing devices from the playback session that are not associated with the identified room;

wherein the synchronizing playback includes synchronizing the target device with the additional target device(s).

10. The non-transitory computer readable medium of claim 9, wherein a playback queue for the playback session is stored on a first master device of the networked rendering devices, and the removing of devices removes the first master device, and further comprising:

migrating the playback queue from the first master device to a second master device associated with the identified room.

11. The non-transitory computer readable medium of claim 9, wherein the instructions further cause the device to perform:

clearing the context of prior commands after the removing of the devices that are not associated with the identified room.

12. The non-transitory computer readable medium of claim 8, wherein the target device is a portable device, and the portable device is associated with the identified room when a protocol discovers the target devices is nearby other devices previously associated with the identified room.

13. The non-transitory computer readable medium of claim 8, wherein the instructions further cause the device to perform:

when the target device is determined to be a dumb device:
identifying a silent primary device for the target device,
retrieve, by the silent primary device, the asset component of the media asset for identified for the target device, and
send the retrieved asset component from the silent primary device to the target device.

14. The non-transitory computer readable medium of claim 8, wherein the instructions further cause the device to perform:

when the target device is a member of a stereo pair, the synchronizing playback includes both the target device and the other member of the stereo pair.

15. A playback device, comprising:
a processing device,
a transceiver,
a memory system storing program instructions that, when executed, cause the processing device to perform:
in response to a command to play a media asset in an identified room for a playback session of networked rendering devices:
identifying a current playback room based on a context of prior commands in the playback session,
and determining whether the current playback room and the identified room are different;
when the current playback room and the identified room are different:
identifying a target device associated with the identified room, and
identifying, from capabilities of the identified target device, which asset component of a plurality of asset components in the media asset to be rendered by the target device, wherein the asset component is a first representation of a media asset of the playback session; and
synchronizing playback of the media asset on the target device with playback on other device(s) that are members of the playback session, the synchronizing including identifying respective other asset component(s) to be rendered pursuant to the playback session by the other device(s), the other asset component(s) representing other representation(s) of the media asset, and timing of playback of the asset component to timing of the other asset component(s).

16. The playback device of claim 15, wherein the instructions further cause the processing device to perform:

identifying additional target device(s) associated with the identified room;
adding the target device and the additional target device(s) to the playback session; and
removing devices from the playback session that are not associated with the identified room;
wherein the synchronizing playback includes synchronizing the target device with the additional target device(s).

17. The playback device of claim 16, wherein a playback queue for the playback session is stored on a first master device of the networked rendering devices, and the removing of devices removes the first master device, and wherein the instructions further cause the processing device to perform:

migrating the playback queue from the first master device to a second master device associated with the identified room.

18. The playback device of claim 16, wherein the instructions further cause the processing device to perform:

clearing the context of prior commands after the removing of the devices that are not associated with the identified room.

19. The playback device of claim 15, wherein the target device is a portable device, and the portable device is associated with the identified room when a protocol discovers the target devices is nearby other devices previously associated with the identified room.

20. The playback device of claim 15, wherein the instructions further cause the processing device to perform:

when the target device is determined to be a dumb device, identifying a silent primary device for the target device,
retrieve, by the silent primary device, the asset component of the media asset for identified for the target device, and
send the retrieved asset component from the silent primary device to the target device.

21. The playback device of claim 15, wherein the instructions further cause the processing device to perform:

when the target device is a member of a stereo pair, the synchronizing playback includes both the target device and the other member of the stereo pair.

22. The method of claim 1, further comprising:
sending a request to the target device to identify the capabilities of the target device, and
receiving a response from the target device identifying the capabilities of the identified target device.

23. The method of claim 1, wherein
the capabilities of the identified target device include a playback application supported on the identified target device; and
the identifying of the asset component of the media asset is based on the playback application.

24. The method of claim 1, wherein
the capabilities of the identified target device include a coding format supported on the identified target device; and the identifying of the asset component of the media asset is based on the coding format.

\* \* \* \* \*

UNITED STATES PATENT AND TRADEMARK OFFICE
CERTIFICATE OF CORRECTION

PATENT NO. : 11,509,726 B2  
APPLICATION NO. : 16/146098  
DATED : November 22, 2022  
INVENTOR(S) : Thomas Alsina et al.

Page 1 of 1

It is certified that error appears in the above-identified patent and that said Letters Patent is hereby corrected as shown below:

In the Specification  
Column 4, Line 38, please replace "either to add (stage 320)" with --either to add (stage 310)--.

In the Claims  
Column 31, Line 48, please replace "media asset to be rendered" with --media asset is to be rendered--;  
Column 32, Line 23, please replace "retrieve" with --retrieving--;  
Column 32, Line 24, please replace "identified for the target" with --the identified target--;  
Column 32, Line 26, please replace "send the retrieved" with --sending the retrieved--;  
Column 33, Line 60, please replace "media assest to be rendered" with --media asset is to be rendered--;  
Column 34, Line 43, please replace "retrieve" with --retrieving--;  
Column 34, Line 44, please replace "identified for the target" with --the identified target--;  
Column 34, Line 46, please replace "send the retrieved" with --sending the retrieved--.

Signed and Sealed this  
Twenty-seventh Day of December, 2022

Katherine Kelly Vidal  
*Director of the United States Patent and Trademark Office*